United States Patent [19]

Lewis et al.

[11] 4,381,540
[45] Apr. 26, 1983

[54] ASYNCHRONOUS CHANNEL ERROR MECHANISM

[75] Inventors: David O. Lewis, Rochester; John W. Reed, Pine Island, both of Minn.

[73] Assignee: International Business Machines Corporation, Armonk, N.Y.

[21] Appl. No.: 164,161

[22] Filed: Jun. 30, 1980

Related U.S. Application Data

[63] Continuation of Ser. No. 953,651, Oct. 23, 1978, abandoned.

[51] Int. Cl.³ .............................................. G06F 11/34
[52] U.S. Cl. ........................................ 364/200; 371/9
[58] Field of Search ................. 364/200, 900; 371/15, 371/16, 29, 4, 9, 49

[56] References Cited

U.S. PATENT DOCUMENTS

| | | | |
|---|---|---|---|
| 3,286,239 | 11/1966 | Thompson et al. | 364/200 |
| 3,564,502 | 2/1971 | Boehner et al. | 364/200 |
| 3,659,273 | 4/1972 | Knauft et al. | 364/200 |
| 3,688,274 | 8/1972 | Cormier et al. | 364/200 |
| 3,704,363 | 11/1972 | Salmassy et al. | 364/200 |
| 3,810,120 | 5/1974 | Huettner et al. | 364/200 |
| 3,873,819 | 3/1975 | Greenwald | 371/16 |
| 4,001,783 | 1/1977 | Monahan et al. | 364/200 |
| 4,016,548 | 4/1977 | Law et al. | 364/200 |
| 4,028,667 | 6/1977 | Breslau et al. | 364/200 |
| 4,041,462 | 8/1977 | Davis et al. | 364/200 |
| 4,062,059 | 12/1977 | Suzuki et al. | 364/200 |

FOREIGN PATENT DOCUMENTS 1572892 8/1980 United Kingdom .

OTHER PUBLICATIONS

IBM Technical Disclosure Bulletin, vol. 20, No. 4, Sep. 1977, pp. 1362–1365, containing "Support Processor Error Recovery Mechanism" by Oliver.

IBM Technical Disclosure Bulletin, vol. 19, No. 8, Jan. 1977, pp. 2874–2876, containing "Internal On-Line and Internal Error and Statistics Logging in Large Data Base Systems" by Heimsoth.

*Primary Examiner*—James D. Thomas
*Assistant Examiner*—David Y. Eng
*Attorney, Agent, or Firm*—Donald F. Voss

[57] ABSTRACT

An apparatus is provided for assembling information concerning the occurrence of a channel error to form a channel error event consisting of four fields: a channel function field; a field identifying the I/O register in use at the occurrence of the channel error; a field identifying the particular I/O adapter using the channel when the error occurred; and a field specifying the type of channel error. The four-field channel error event is placed in an I/O event stack accessible to the CPU, and the CPU is notified of the addition to the I/O event stack. If the attempt to store the channel error event on the I/O event stack fails, the channel is stopped until the CPU signals the channel to restart and to again attempt to log the channel error event on the I/O event stack.

8 Claims, 38 Drawing Figures

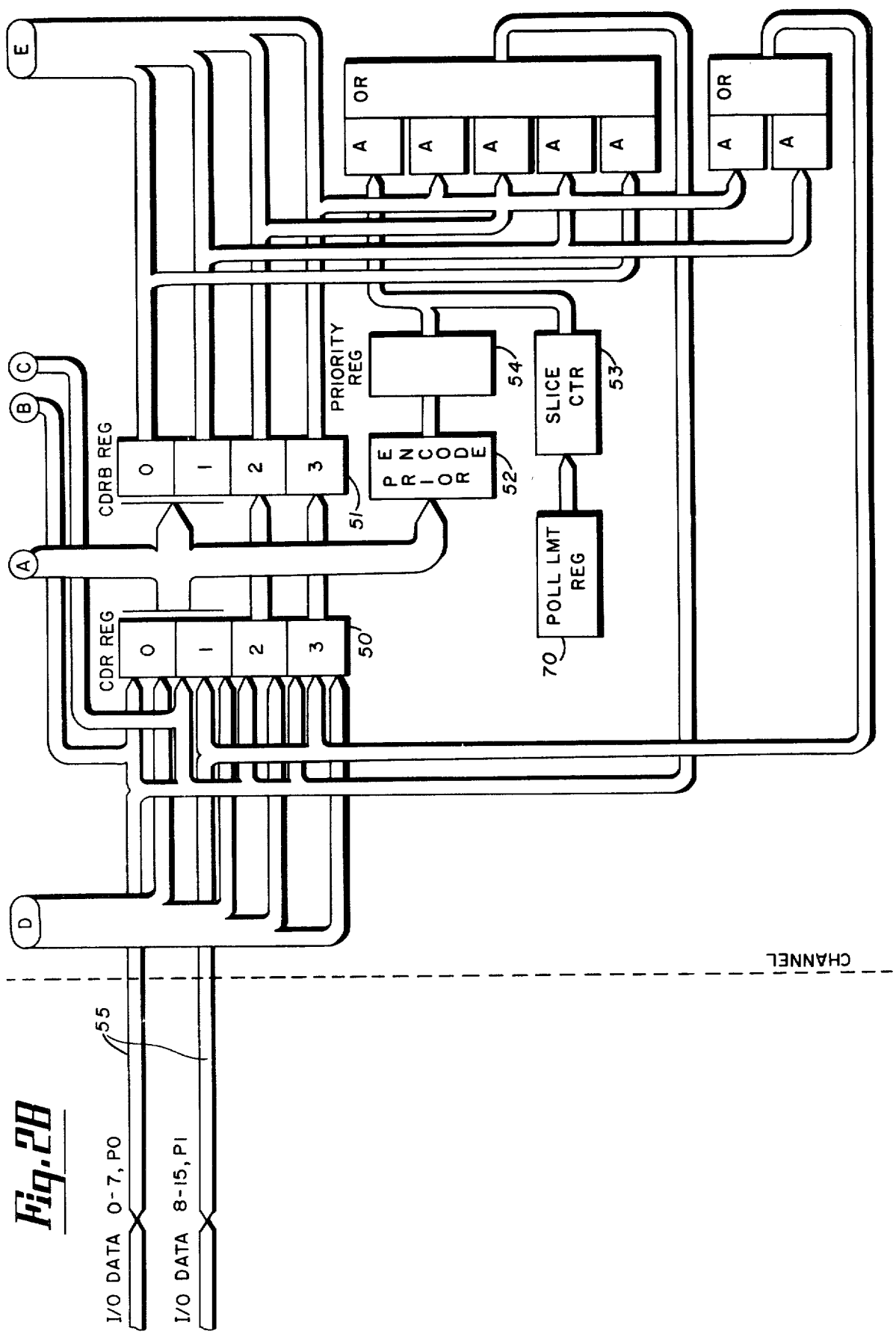

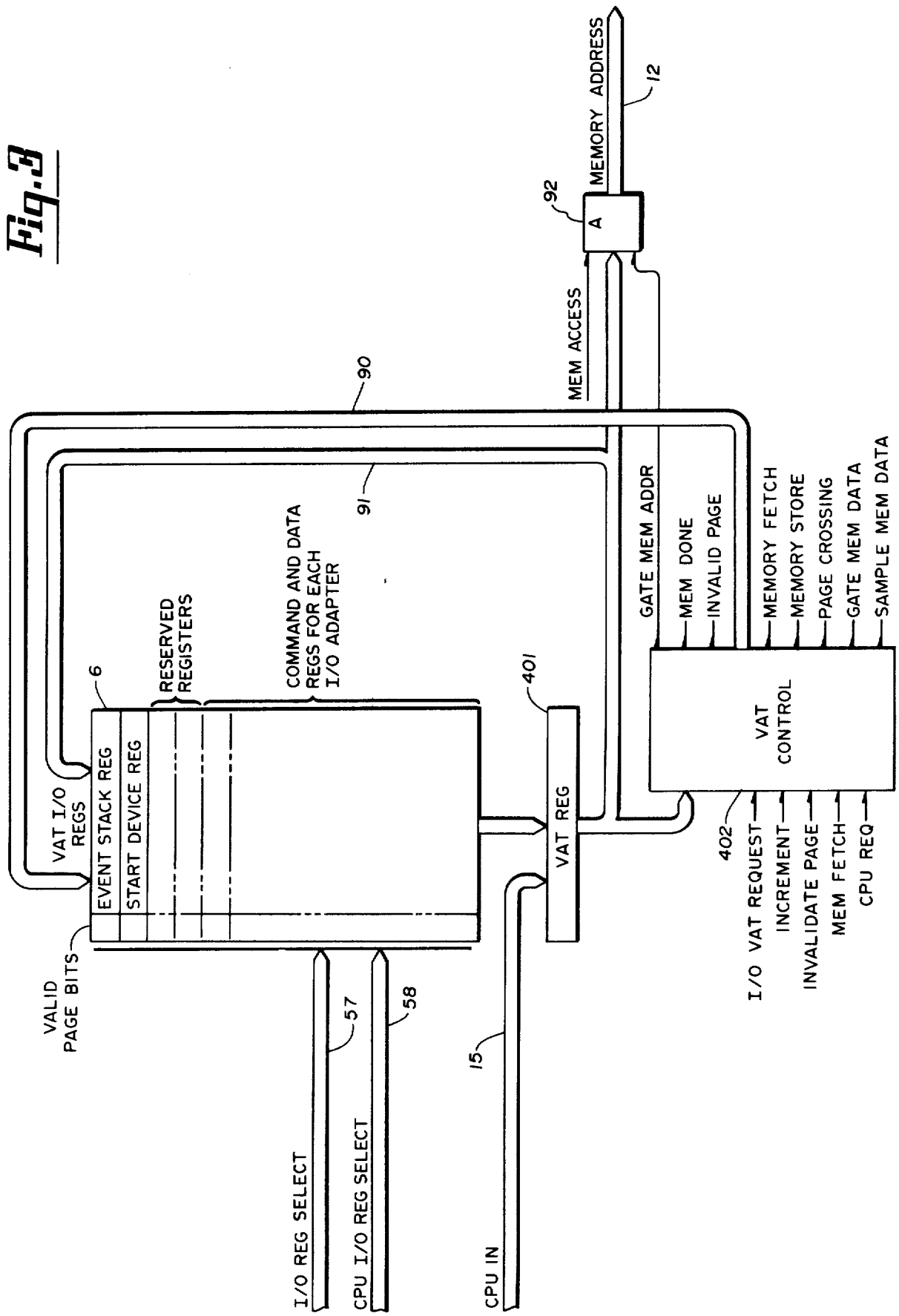

| BITS | CCR BYTE 0 | | | |
|---|---|---|---|---|
| 0 | 0=FUNCTION EVENT | | 1=MEMORY REQUEST | |
| 1 | IF BIT 0=0 THEN | | IF BIT 0=1 THEN | 1=DECREMENT<br>0=INCREMENT |
| 2 | | | | 1=STORE INTO MEMORY<br>0=FETCH FROM MEMORY |
| 3 | | | | 1=IGNORE PAGE<br>CROSSING |
| 4 | | 1=ALLOCATE PAGE | | MUST BE 0 |
| 5 | | 1=RESOLVE NEXT PAGE | | |
| 6 | | 1=COMMAND END | | |
| 7 | ↓ | 1=COMMAND END/FETCH NEXT COMMAND | ↓ | ↓ |

| BITS | CCR BYTE 1 |
|---|---|
| 0 | VAT I/O REGISTER DESIGNATION |
| 1 | |
| 2 | BITS 0-7=0→EVENT STACK REG<br>BITS 0-6=0, BIT 7=1→START DEVICE REG |
| 3 | BITS 0-5,7=0, BIT 6=1→RESERVED REG<br>BITS 0-5=0, BITS 6,7=1→RESERVED REG |
| 4 | |
| 5 | |
| 6 | |
| 7 | ↓ |

*Fig. 4*

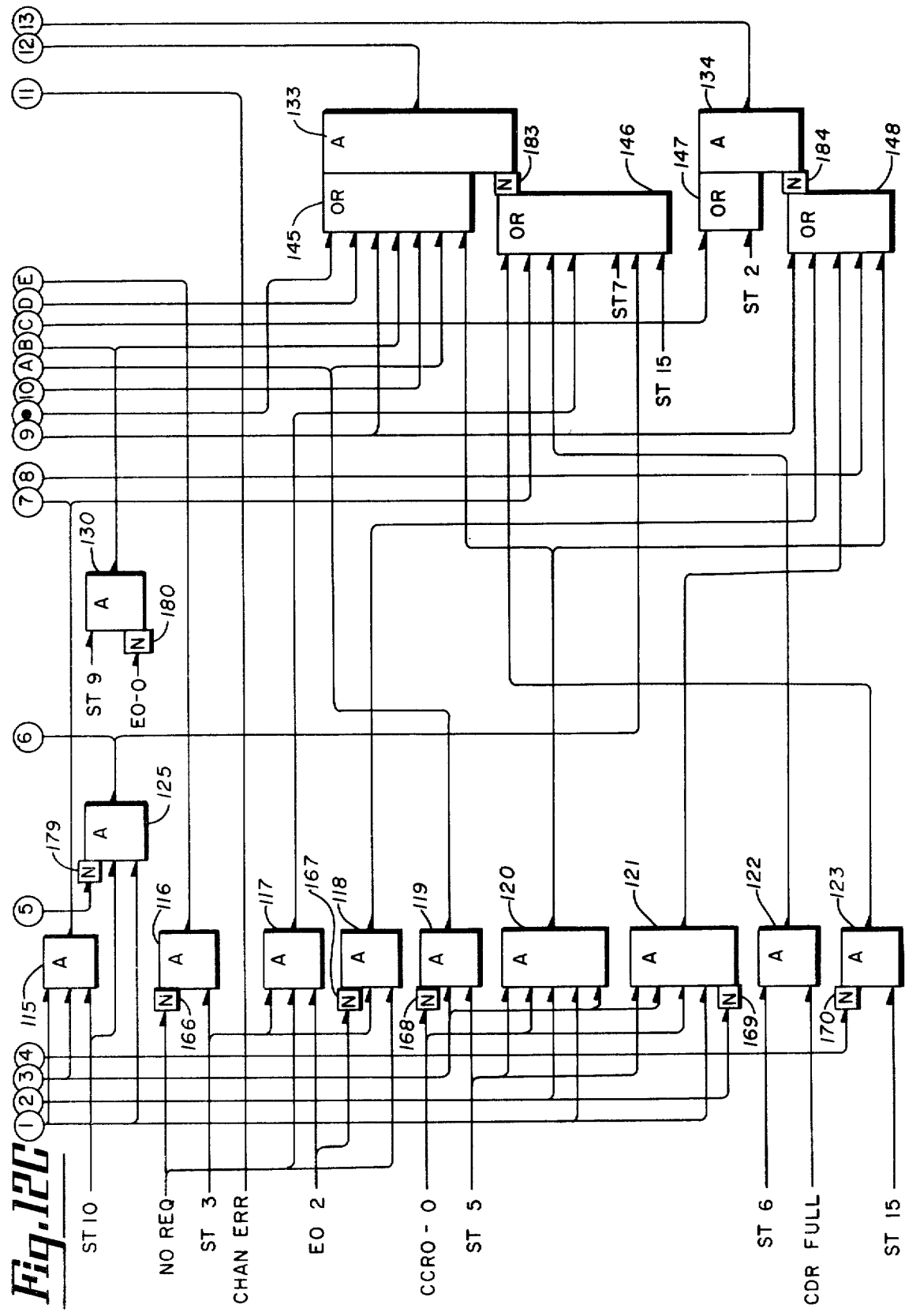

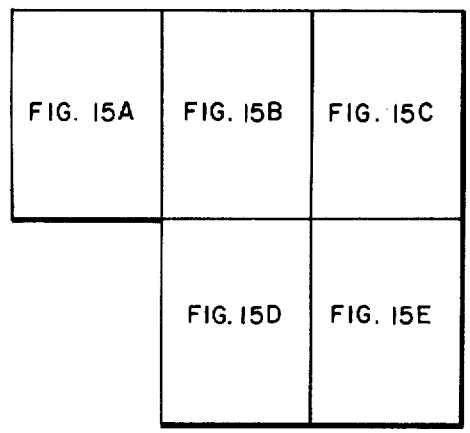
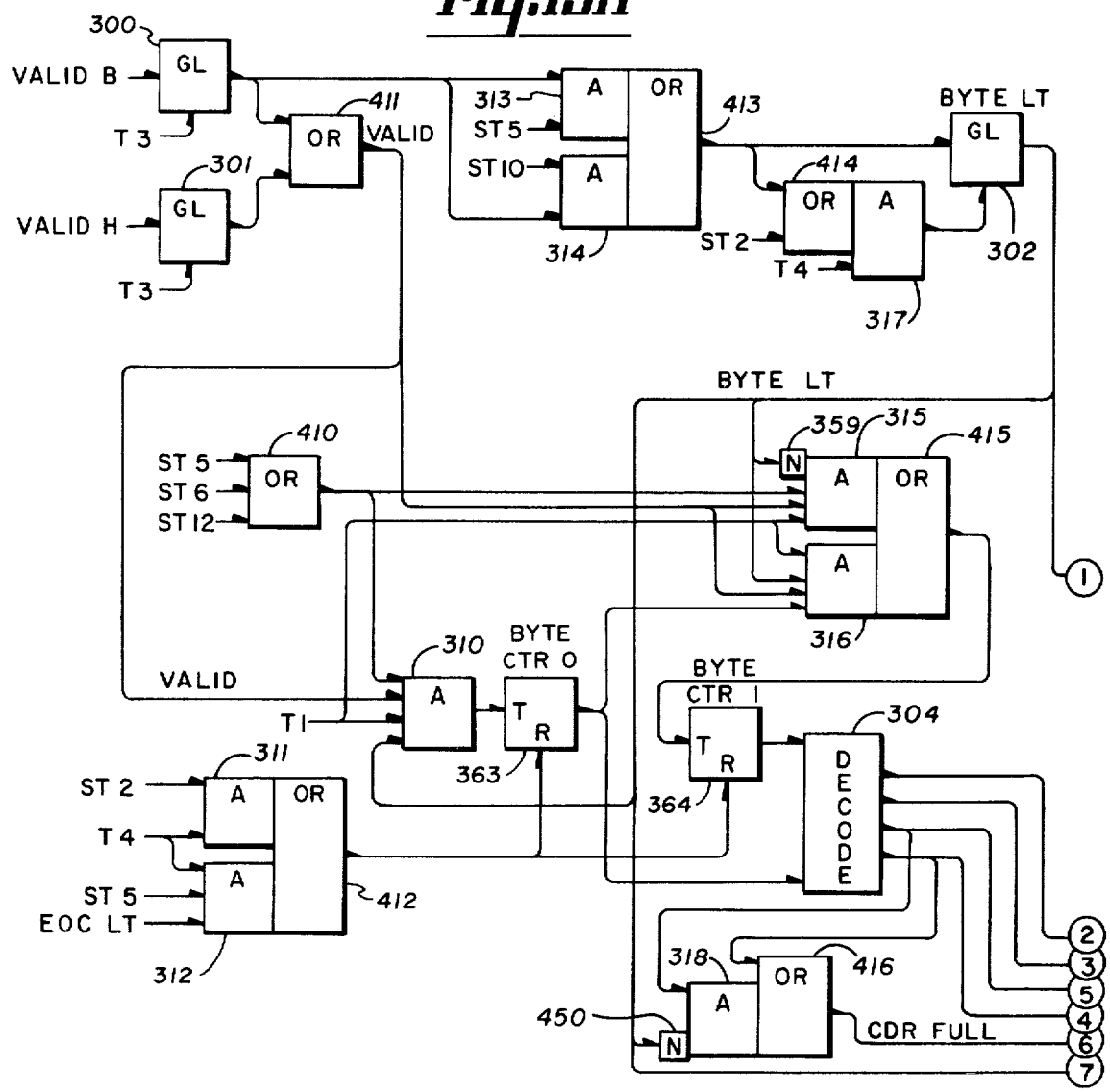

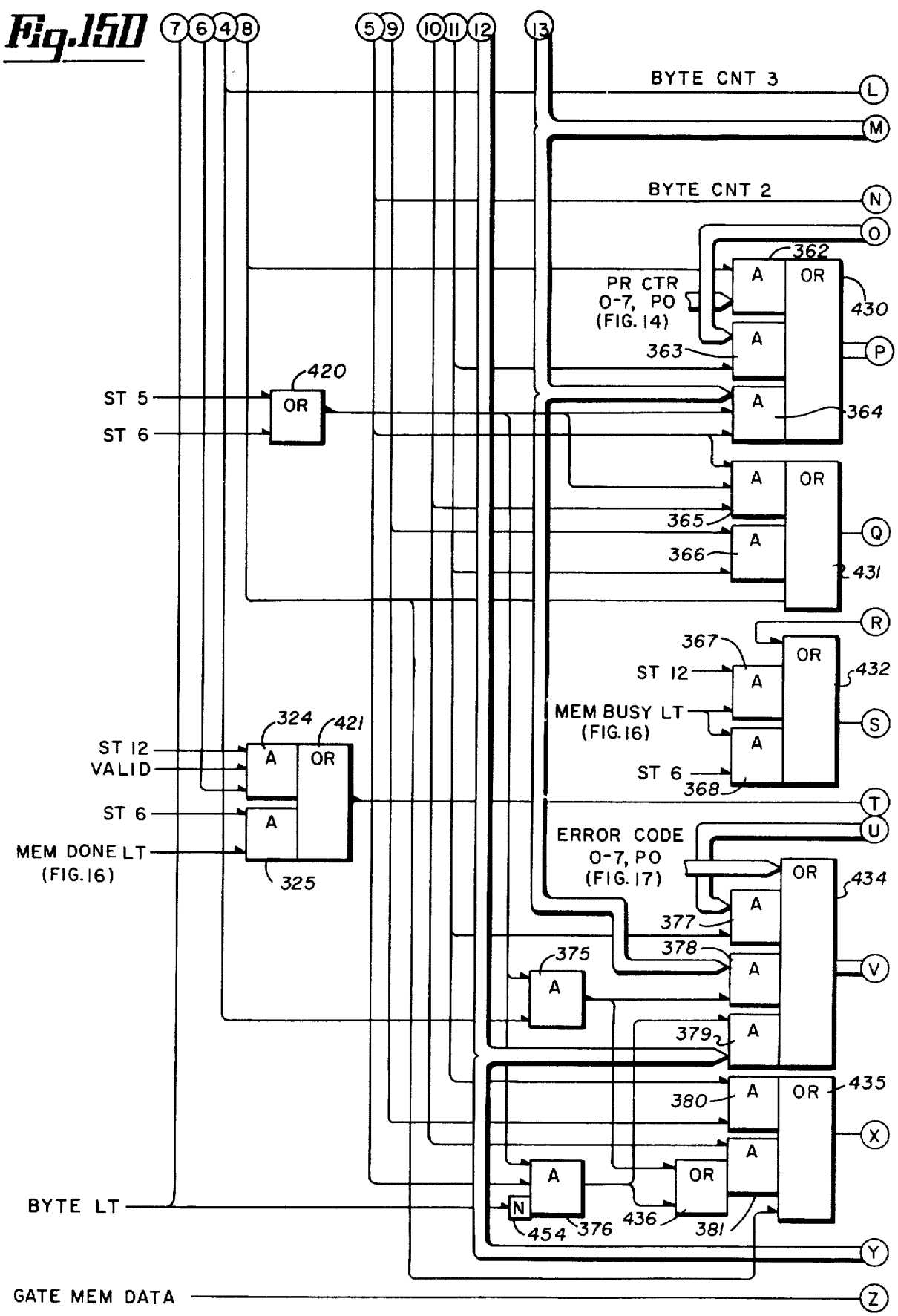

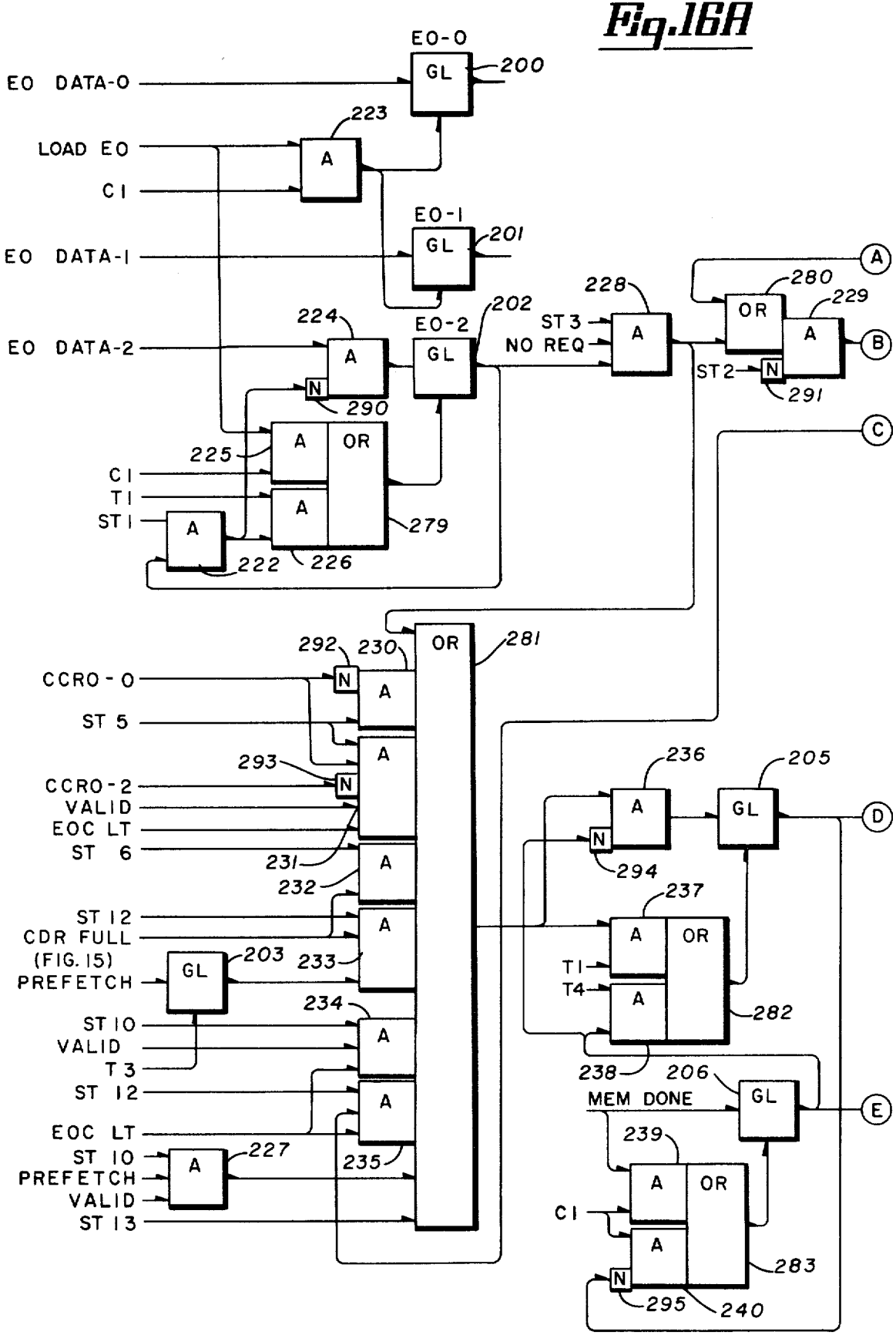

ASYNCHRONOUS CHANNEL ERROR MECHANISM

This is a continuation of application Ser. No. 953,651, filed Oct. 23, 1978, now abandoned.

BACKGROUND OF THE INVENTION

1. Field of the Invention

The present invention relates to data processing systems employing virtual memory partitioned into pages and having a channel which communicates with an input-output (I/O) device adapter. More particularly, the present invention relates to apparatus for formulating channel error status information and placing this information on an I/O event stack accessible by the central processing unit (CPU).

2. Description of the Prior Art

In a data processing system having a channel which communicates with an I/O device adapter a variety of errors may occur. These errors may be simple parity errors occurring during a transfer of information on a bus or they may be errors relating to the particular data field formats and operational sequences defined for the channel interface with the I/O adapter. In most systems, the detection of an error at the channel interface causes the system to stop, at or near the point of error. This strategy allows trouble-shooting personnel to identify the failing device and the type of error. The obvious disadvantage is that an entire system may be brought to a halt as a result of an error occurring in one I/O adapter.

One known prior art arrangement for dealing with channel interface errors is shown in U.S. Pat. No. 3,810,120, issued to Huettner, et al. This patent shows an apparatus for detecting a failure or error in any one of several peripheral devices connected to a common input/output bus. Upon detecting the failure, the failed peripheral device is disabled automatically. A second known prior art arrangement appears in U.S. Pat. No. 4,016,548 issued to Law, et al. which shows a communications multiplexer module which can detect certain kinds of I/O device errors. It appears, however, that neither of these arrangements provides identification of the failing I/O device to the CPU or assembles the error or failure status information for later fetching by the CPU and possible error recovery action.

SUMMARY OF THE INVENTION

The present invention concerns an arrangement for formulating channel error status information into a channel error event field and placing this information on a I/O event stack. The channel error event field consists of four parts. The first two parts are from the channel control field (CCF) sent by the I/O adapter to the channel. These two parts contain, respectively, function information defining the type of data transfer or other I/O function involved and the designation of the I/O register being used for the I/O function during which the error occurred. The third part of the channel error event field identifies the I/O adapter using the channel at the occurrence of the error. The fourth part is an error code defining the type of error.

In the process of placing the four-part error event on the I/O event stack by storing the error event field in the next event stack location in main storage, it may be determined that the channel has failed due to another error. In this case, the channel goes into a stop state from which it can be restarted by the CPU for a second attempt to log the event. If the error event is successfully logged on the I/O event stack then the channel will check to see if other I/O adapters can be successfully polled while the I/O adapter involved in the error remains in a halted state.

The principal objects of the present invention are: (1) to provide means for formulating channel error information and communicating it back to the CPU; (2) to provide means for communicating to the CPU channel error status information which includes an identification of the I/O adapter using the channel when the error occurred and an identification of the type of error; and (3) to provide means for permitting the CPU to perform error recovery following occurrence of a channel error.

BRIEF DESCRIPTION OF THE DRAWINGS

In the accompanying drawings forming a material part of this disclosure;

FIGS. 2A—2B, is a block schematic and flow diagram of the channel circuitry incorporating a portion of the invention and showing lines and buses connecting the channel to the CPU, the VAT, the memory and the I/O adapter.

FIG. 3 is a block schematic and flow diagram of the VAT I/O Registers and a portion of the VAT embodying a portion of the invention.

FIG. 4 is a format diagram of bytes 0 and 1 of the Channel Command Register, showing the meaning of various bit configurations of the Channel Command Field.

FIGS. 12A—12C, is a detail block schematic and flow diagram of the main sequencing circuitry for the channel.

FIG. 15, including FIGS. 15A—15E, is a detail block schematic and flow diagram of the channel registers and their supporting circuitry, showing lines and busses connected to the VAT, the I/O adapter and the circuitry of FIGS. 12-14 and 16-17.

FIGS. 16A—16B, is a detail block schematic and flow diagram of the channel circuitry driving the control lines from the channel to the VAT and the CPU, showing lines and busses connected to the VAT, the I/O adapter, the CPU and the circuitry of FIGS. 12-15 and 17.

DESCRIPTION OF THE INVENTION

General Description of Operation

Figure 1:
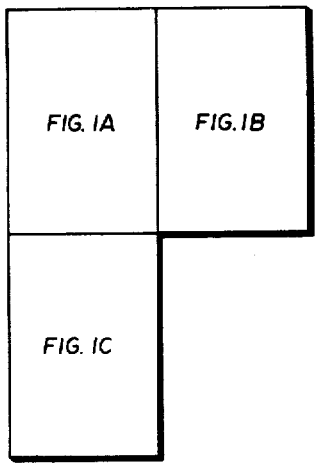
FIG. 1, including

A computer system in accordance with the present invention consists generally, as shown in FIG. 1, of a central processing unit (CPU) 1, a virtual address translator (VAT) 2, an I/O channel 3, an addressable memory or main storage 5 and an I/O device adapter 4. Instructions fetched and executed by the CPU 1, as well as data and I/O commmands, are all stored in the addressable memory or main storage 5. These various elements are connected to each other directly and indirectly by means of various lines and busses, which will be discussed in greater detail below and are identified in FIG. 1. The system would typically include a plurality of I/O adapters, but, for simplicity only one is shown in FIG. 1. It will also be understood that the I/O adapter 4 is connected to one or more I/O devices, e.g., magnetic tape drive, magnetic disk drive, not shown here. The I/O adapter 4 is the interface between the channel 3 and the I/O devices. For purposes of the present discussion, the relationship between an I/O adapter and its attached I/O device need not be considered in detail, and generally only the channel-adapter relationship will be described.

Operation of the system in accordance with the present invention can best be described in terms of a group of sequences or protocols which specify certain basic patterns of communication and interaction among the elements shown in FIG. 1. Among the sequences are the following:

Start Channel Sequence—The CPU 1 informs the I/O adapter 4 that a data transfer command is available for execution, i.e. that data is to be moved into or out of the memory 5 via the channel 3.

Channel Poll Sequence—The channel 3 polls the I/O adapters 4 attached to it to determine if any I/O adapter wishes to communicate over the lines and busses connecting the adapters 4 to the channel 3, collectively called the channel interface. An I/O adapter 4 will request the interface to report the outcome of an executed command, to request certain services from the channel 3, and so forth.

Channel Grant Sequence—The channel 3, in response to the request of an I/O adapter 4, connects the adapter 4 to the channel interface to permit data to be transferred to and from the I/O adapter 4.

I/O Interrupt Sequence—The I/O adapter 4, upon completion of processing of a data transfer command from the CPU 1, will request the interface. When the interface is granted to the adapter 4, it reports the status of the command which it processed.

I/O Page Crossing Sequence—The I/O adapter 4, in fetching or storing data, encounters the boundary of a virtual memory page, making it necessary to locate the real storage address of the next virtual page at the boundary.

I/O Disconnect Sequence—When an I/O adapter 4 attempts a transfer to or from a virtual address which has not yet been resolved into a main storage address, the I/O adapter 4 is informed that it cannot proceed and is passed over by the channel 3 until a later round of polling, when it may request resumption of the transfer.

Channel Error Sequence—When an error occurs at the channel interface, the channel assembles a four-byte channel error event from information contain in various registers in the channel hardware. The channel stores the channel error event on the I/O event stack. The CPU removes the event from the I/O event stack and attempts error recovery.

A more detailed exposition of each of the sequences and their relation to each other follows. In this exposition, frequent reference will be made to certain details of the channel 3, which appear in FIG. 2, and of the VAT 2, which appear in FIG. 3. In addition, reference will be made to the format of the Channel Command Register (CCR) containing the Channel Command Field (CCF), a two-byte field, the significance of the bits of which is explained in FIG. 4.

Timing signals which govern the system and the various sequences are generated by five clocks: C1, T1, T2, T3 and T4. C1 is the basic clock, while T1, T2, T3 and T4 produce pulses at one-fourth the frequency of C1. As seen in FIG. 11, the pulses of T1, T2, T3 and T4 are synchronized with C1 and each other such that when T1 matches one pulse of C1, T2 matches the next pulse, T3 the next pulse, T4 the next pulse, T1 the next pulse, and so forth. In the timing diagrams for the various sequences, which appear as FIGS. 6 through 10, the basic cycle corresponds to four pulses of C1. The timing pulses are delivered to the channel 3 from the CPU 1 over the CHANNEL CLOCKS bus, shown in FIG. 1. Use of these timing pulses is discussed in greater detail in the hardware description which appears below.

*Start Channel Sequence*—The CPU 1 informs the I/O adapter 4 that a data transfer command is pending, by means of a sequence of communications called the Start Channel Sequence. For purposes of communication between the channel 3 and the CPU 1 in this sequence, a series of I/O address registers, identified as the VAT I/O Registers 6, associated with the VAT 2 (FIG. 1), are used. The VAT I/O Registers 6 include, as shown in FIG. 3, an Event Stack Register, a Start Device Register, two reserved registers and a number of other registers which constitute I/O command registers and I/O data registers for each I/O adapter used in the system. The particular register to be used by the VAT 2 is designated by a code number transmitted to the VAT 2 on the I/O REG SELECT bus 57 or the CPU I/O REG SELECT bus 58. The code for the Event Stack Register is hexadecimal '00'. The code for the Start Device Register is hexadecimal '01'. Higher code numbers designate the reserved registers and data and command registers for various I/O adapters 4. The Start Channel Sequence starts with the CPU 1 loading the address of an I/O command into a designated I/O command register and the address of the data to be transferred into a designated I/O data register, both found in the array of VAT I/O Registers 6 (FIG. 3). The CPU 1 also loads the Start Device Register with the address of the I/O command. This address is used to communicate to the channel 3 the device or I/O adapter address of the I/O adapter 4 to which the CPU 1 wishes to communicate the data transfer command. Thus, the Start Device Register and the designated I/O Command Register contain the same address. In the following, an I/O command eight bytes in length will be used as an example.

The CPU 1 loads the various VAT I/O Registers 6 using the busses 15, 58 and 91, the VAT Register 401, and the CPU REQ line. After loading the VAT I/O Registers for the I/O adapter 4, the CPU 1 loads the EO Register in the channel control 60, shown in FIG. 2, by means of the EO DATA bus and the LOAD EO line. The EO Register is interrogated by the channel control 60 and when it is found to be loaded, this informs the channel control 60 that a command is pending for the I/O adapter 4.

Figure 2:
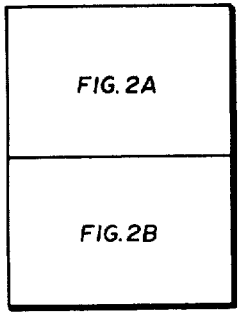
FIG. 2, including

Referring now to FIGS. 1, 2 and 3, in response to the EO Register being loaded, the channel control 60, which includes means for accessing memory 5 at addresses specified in the VAT I/O Registers 6, activates the I/O VAT REQUEST, MEM ACCESS, MEM FETCH and INCREMENT lines to the VAT 2. The channel control 60 then gates to the VAT 2 instructions to select the Start Device Register (i.e., hexadecimal '01') by means of the I/O REG SELECT bus 57. The Start Device Register will be used by the VAT 2 to fetch from memory 5 the device address for the I/O adapter 4 to which the CPU 1 wishes to communicate. The I/O VAT REQUEST line, along with the I/O register code sent on the I/O REG SELECT bus 57, cause the VAT 2 to select an I/O register from the VAT I/O Registers 6. Each I/O register in the VAT I/O Registers 6 (shown in FIG. 3) contains a resolved memory address, i.e., the real address of a page in memory 5, (as opposed to a virtual address of a page which may or may not be in memory 5), and a bit called a Valid Page bit. When the Valid Page bit is on, this means that the memory address is valid and can be used by an adapter. If the Valid Page bit is off, the address is invalid and no longer available for use by an adapter. Memory 5 (or main storage) is arranged into 512-byte pages; when the address in a VAT I/O Register is incremented or decremented outside the 512-byte range of a page, the Valid Page bit is reset to invalid (off). In response to the channel 3 activating the I/O VAT REQUEST line and designating the Start Device Register, the VAT 2 reads out into the VAT Register 401 (FIG. 3) the Start Device Register, containing the memory address of the command for the I/O adapter 4. By convention, the first byte of the command is always the device address of the I/O adapter 4 to which the CPU 1 wishes to communicate; the remainder is command data. From the VAT Register 401, the command address is gated to the memory 5 via the MEMORY ADDRESS bus. Because the MEM FETCH line from the channel 3 to the VAT 2 is active, the VAT 2 activates the MEMORY FETCH line to the memory 5. The VAT control 402, (which includes means for incrementing and decrementing addresses) then increments the address in the VAT Register 401 by four, because the INCREMENT line is on, and stores the incremented address back into the Start Device Register, by means of the bus 90.

The memory 5 fetches the data using the (unincremented) address from the VAT Register 401 and places that data on the MEMORY DATA bus (FIGS. 1 and 2). When the VAT 2 turns on the SAMPLE MEM DATA line to the channel 3, the data on the MEMORY DATA bus 7 is gated into the CDR Register 50, shown in FIG. 2. The MEMORY DATA bus 7 is a 36 bit bidirectional bus, implying that data can be sent from the CPU 1 or the channel 3 to the memory 5, or from the memory 5 to the CPU 1 or the channel 3, on the same bus.

After the data has been loaded into the channel's CDR Register 50, the VAT 2 raises the MEM DONE line to the channel 3 indicating that the VAT 2 and memory 5 have completed. The channel 3 then loads the data from the CDR Register 50 into the CDRB Register 51, shown in FIG. 2. At the same time as the data is loaded into the CDRB register 51, the channel 3 activates the TA tag line and gates the data from byte 0 the CDR Register 50 onto the bidirectional I/O DATA bus 55, bits 0-7, parity P0 (FIG. 2). As noted above, the data in byte 0 of the CDR Register 50 is the device address of the I/O adapter 4 to which the CPU 1 wishes to communicate. When the TA tag signal becomes active on the channel interface, all the I/O adpaters 4 compare their device addresses with the device address on the I/O DATA bus. If a compare occurs, the I/O adapter 4 on which the compare occurred activates the VALID B (or VALID H) line to the channel 3, signalling that the I/O adapter 4 has accepted the device address and recognized that there is a command directed to it.

Following this first acceptance signal, the I/O adapter 4 has two different options for handling the command. The I/O adapter 4 can fetch the command at a later time, or the I/O adapter 4 can take the command immediately from the channel 3. If the I/O adapter 4 chooses to fetch the command at a later time, the I/O adapter 4 activates the EOC line, as a termination signal, along with the VALID B (or VALID H, depending on whether the adapter is a byte adapter or a halfword adapter) line. This indicates to the channel 3 that no more data transfers are to take place. The channel 3 then deactivates the TA tag line and removes the device address from the I/O DATA bus 55. The channel 3 raises the I/O VAT REQUEST line and the INVALIDATE PAGE line to the VAT 2. The channel 3 then designates the Start Device Register on the I/O REG SELECT bus 57 to the VAT 2. When the VAT 2 detects the I/O VAT REQUEST line, the VAT 2 fetches the contents of the Start Device Register from the VAT I/O Registers 6 into the VAT Register 401. Because the INVALIDATE PAGE line is raised and the MEM ACCESS line is not raised, the VAT 2 resets the Valid Page bit to invalid (off) in the VAT Register 401 and stores the contents (the command address and the reset Valid Page bit) back into the Start Device Register via the bus 90. This is done so that the CPU 1 can determine when the Start Device Sequence is completed. The CPU 1 determines this by reading out the Start Device Register and testing to see if the Valid Page bit is on. If the Valid Page bit is still on, the channel 3 has not completed the operation. If the Valid Page bit is off, the channel 3 has completed the operation. The I/O adapter 4, for its part, has stored in its Q LT latch (FIG. 1) an indication that an I/O command was delayed and is now pending. After the VAT 2 has stored the Start Device Register back into the VAT I/O Registers 6, the VAT 2 activates the MEM DONE line to the channel 3 indicating the operation is complete. When the channel 3 detects that this line is active, the channel 3 enters the Channel Poll Sequence, which as described below, is used to poll the I/O adapters 4 to determine if they have any requests for use of the channel 3.

Figure 6:
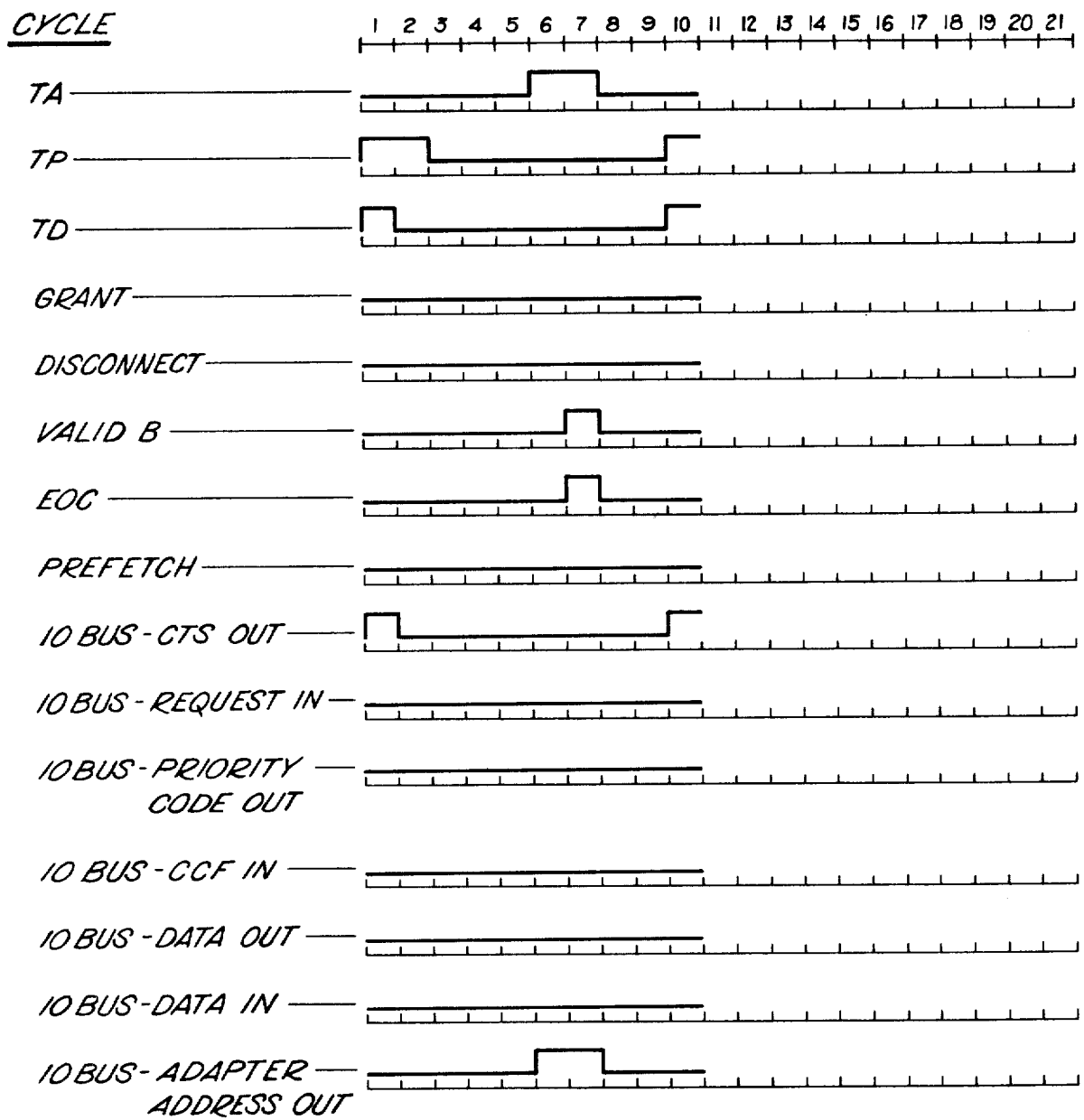
FIG. 6 is a timing diagram showing the timing of activation of various channel interface lines during a Channel Poll Sequence followed by a Start Channel Sequence in which the I/O adapter delays acceptance of a command.

FIG. 6 shows a timing diagram for the channel interface lines for the delayed command acceptance option of the Start Channel Sequence. In time cycles 1 and 2 the channel 3 determines if any I/O adapter is requesting use of the channel. (See Channel Poll Sequence below) The EO Register is loaded prior to cycle 2. Assuming no I/O requests from the I/O adapters 4, the channel 3, aided by the VAT 2, fetches the I/O command from memory 5, using the Start Device Register, during cycles 3, 4, and 5. The I/O command is loaded into the CDR Register 50 during cycle 5. The channel control 60 gates the data from the CDR Register 50 into the CDRB Register 51, places the device address (CDR Register 51, byte 0) on the I/O DATA bus 55 and activates the TA tag line to the I/O adapter 4 in cycle 6. An I/O adapter 4, upon recognizing its device address, activates the VALID B (or VALID H) line (device address acceptance signal) and the EOC line (termination signal) to the channel 3 in cycle 7. In cycle 8, the channel 3 detects the VALID B (or VALID H) and EOC lines, deactivates the TA tag line and removes the device address from the I/O DATA bus 55. The I/O adapter 4 then deactivates the VALID B (or VALID H) and EOC lines. In cycles 8 and 9 the channel 3 also resets the Valid Page bit to invalid in the Start Device Register 1. After the Valid Page bit is reset, the channel 3 returns to the Channel Poll Sequence (see below) in cycle 10.

If the I/O adapter 4 wishes to fetch the command immediately from the channel 3, the I/O adapter 4 recognizing its device address on the I/O DATA bus 55 activates the VALID B (or VALID H) line (as a device address acceptance signal) and the PREFETCH line, but does not activate the EOC line. When the channel 3 detects the VALID B (or VALID H) line active without the EOC line active, the channel 3 activates the TD and GRANT lines, deactivates the TA tag line and gates the first byte of the CDRB Register 51 onto the I/O DATA bus 55. Because the PREFETCH line is active, indicating that more than four bytes of data are to be transferred to the I/O adapter 4, the channel 3 activates its memory addressing means, the I/O VAT REQUEST, MEM ACCESS, INCREMENT and MEM FETCH lines to the VAT 3. The channel 3 then designates the Start Device Register to the VAT 2 on the I/O REG SELECT bus 57. The VAT 2 selects the Start Device Register, loads its contents (an updated address) into the VAT Register 401, updates it by incrementing the contents by four and stores the incremented value back into the Start Device Register. The VAT 2 then gates the (unincremented) address from the VAT Register 401 to the memory 5 along with the MEMORY FETCH line. The memory 5 fetches the data (the second four bytes of the command) addressed by the Start Device Register and stores the data (the command) in the CDR Register 50 by means of the MEMORY DATA bus 7 and SAMPLE MEM DATA line.

The VAT 2 then activates the MEM DONE line to the channel 3 to indicate that the VAT 2 and memory cycle are complete. While the channel 3 is fetching the second four bytes of data into the CDR Register 50, it gates the first four bytes of data, which are already in the CDRB register 51, onto the I/O DATA bus 55. The I/O adapter 4 deactivates the PREFETCH line after receiving the first byte of data from the channel 3 to indicate that no more additional four-byte blocks will be prefetched from memory 5. After the channel 3 has transferred the first four bytes of data to the I/O adapter 4 from the CDRB register 51, the channel 3 gates the second four bytes of data from the CDR Register 50 to the CDRB Register 51 and from there to the I/O adapter 4. When the I/O adapter 4 receives the eighth byte of data (last byte of the command), the I/O adapter 4 activates the EOC line to indicate that no more data is to be transferred. Upon detecting the EOC line becoming active, the channel 3 deactivates the TD and GRANT lines. The I/O adapter 4 then deactivates the VALID B (or VALID H) and EOC lines. After the channel has finished transferring the command, the channel 3 activates the I/O VAT REQUEST and INVALIDATE PAGE lines to the VAT 2 and designates the Start Device Register on the I/O REG SELECT bus to the VAT 2. The VAT 2 selects the Start Device Register by loading it into the VAT Register 401, sets the Valid Page bit off (invalid) and stores the result back into the Start Device Register. The VAT 2 next activates the MEM DONE line to the channel 3, indicating that the VAT cycle is complete. The channel 3 then returns to the Channel Poll Sequence (see below).

Figure 7:
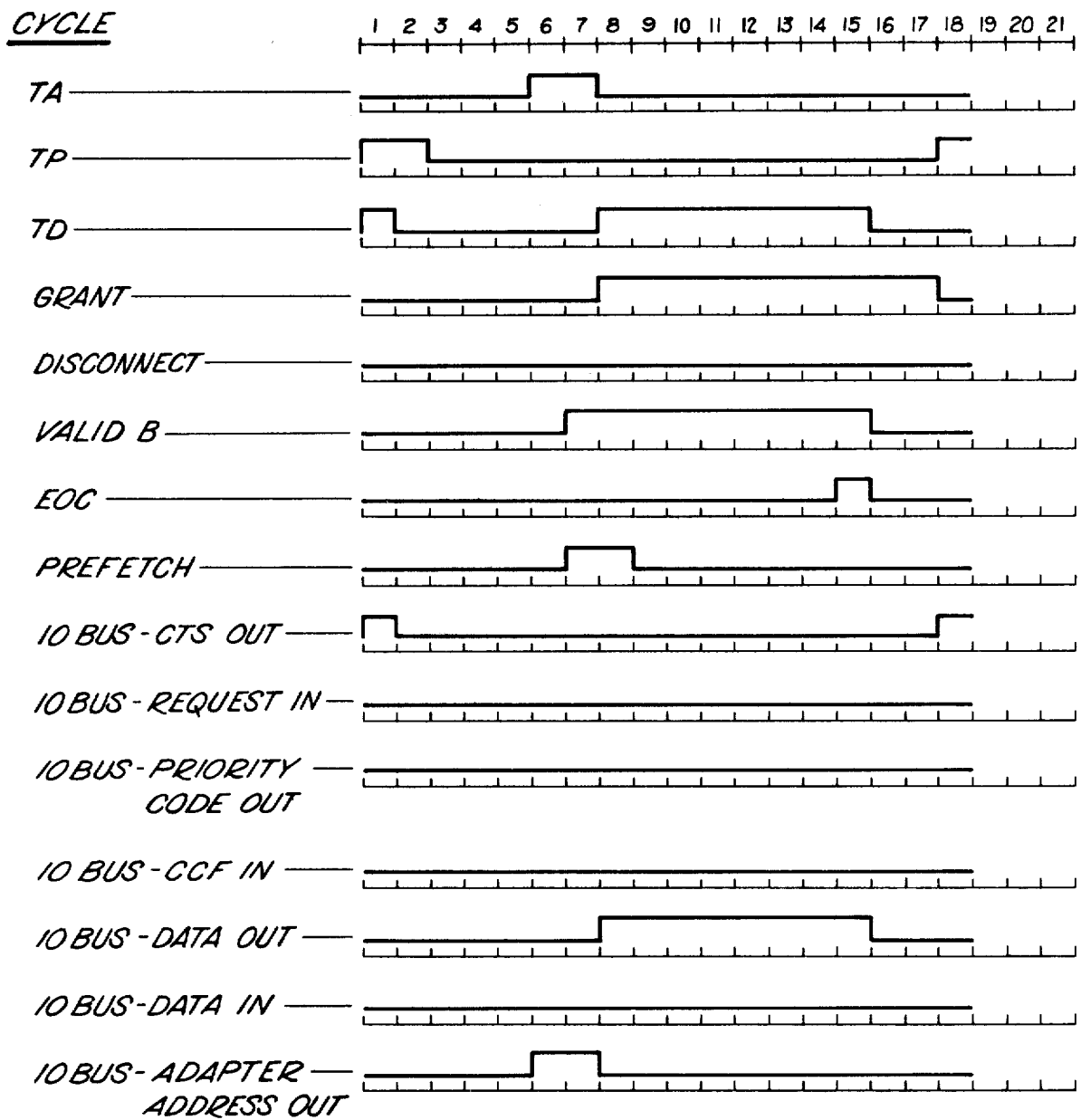
FIG. 7 is a timing diagram showing the timing of activation of various channel interface lines during a Channel Poll Sequence in which the I/O adpater accepts a command immediately.

FIG. 7 is a timing diagram of the immediate command acceptance option of the Start Channel Sequence. During cycles 1 and 2, the channel 3 polls the I/O adapters 4 to determine if any I/O adapter 4 requires use of the channel interface (See Channel Poll Sequence below). The EO Register is loaded by the CPU 1 prior to cycle 2. Assuming no I/O adapter 4 requests use of the channel 3, the channel 3 fetches the I/O command from memory 5, using the Start Device Register, in cycles 3, 4, and 5. In cycle 5, the first four bytes of the I/O command are stored into the CDR Register 50 and then into the CDRB Register 51. In cycle 6, the channel 3 activates the TA tag line and gates the device address from the CDRB Register 51 onto the I/O DATA bus. The I/O adapter 4 that recognizes its device address on the I/O DATA bus 55 raises the VALID B (or VALID H) line (device address acceptance) and the PREFETCH line (but not the EOC line) during cycle 7. In response to detecting the VALID B (or VALID H) line being active, in cycle 8 the channel 3 deactivates the TA tag line, activates the TD and GRANT lines, and gates the first byte of data (the command) onto the I/O DATA bus 55. In this cycle the channel 3 also requests the next memory fetch into the CDR Register 50 since the PREFETCH line is active. In cycles 9, 10 and 11, the channel 3 transfers the second, thrid and fourth bytes of data (the command) over the I/O DATA bus 55. In cycle 9 the I/O adapter 4 deactivates the PREFETCH line indicate that no more four-byte blocks of data will be fetched. Because the second group of four bytes of channel data was stored in the CDR Register 50 in cycle 10, the channel 3 now transfers this data to the CDRB Register 51 in cycle 12 and gates the fifth byte of the command over the I/O DATA bus 55. The channel 3 gates the sixth, seventh, and eighth bytes of the command onto the I/O DATA bus 55 in cycles 13, 14 and 15. In cycle 15, the I/O adapter 4 activates the EOC line to indicate that no more data is to be transferred. The channel 3 deactivates the TD line in cycle 16 in response to the EOC line being active. The I/O adapter 4 deactivates the EOC and VALID B (or VALID H) lines in cycle 16, after receiving the eighth byte of the command. In cycles 16 and 17 the channel 3 causes the Valid Page bit in the Start Device Register to be set off. The channel 3 then returns to the Channel Poll Sequence in cycle 18.

Channel Poll Sequence—The Channel Poll Sequence is performed by the channel 3 to poll the I/O adapters 4 to determine if any I/O adapter 4 is requesting use of the channel interface. A priority mechanism controls the order of polling and the selection of the I/O adapter 4 which is granted use of the channel interface. As best understood from FIG. 2, the channel 3 polls the I/O adapters 4 by activating the TP and TD lines and placing the contents of the Slice Counter Register 53 on the first four bits of the I/O DATA bus 55. The Slice Counter Register 53 is a four-bit counter that starts with a value of 0 and counts upward. Each I/O adapter is identified, and given a priority, in part, by a time slice value assigned to it. All I/O adapters 4 requiring use of the channel 3 when TP and TD become active compare the first four bits on the I/O DATA bus 55 with the four-bit time slice assigned to them. If there is no compare, the I/O adapters 4 do nothing. The channel 3 deactivates the TD line and loads the data from the I/O DATA bus 55 into the first two bytes of the CDR Register 50. The channel 3 then gates the data from the first two bytes of the CDR Register 50 through the Priority Encode circuitry 52 which detects if any bit in these two bytes is active. Assuming no I/O adapter requested use of the channel 3, then no bits in these two bytes will be active. Accordingly, the Slice Counter Register 53 is incremented by 1, unless the Poll Limit Register 70 equals the contents of the Slice Counter Register 53, in which case the Slice Counter Register 53 is restarted with a value of 0.

The channel 3 next activates the TD line again and gates the new contents of the Slice Counter Register 53 over the first four bits of the I/O DATA bus 55. All I/O adapters 4 requiring use of the channel interface again compare the first four bits on the I/O DATA bus 55 with their assigned four-bit time slice. The channel 3 deactivates the TD line and removes the time slice value from the I/O DATA bus 55. Any I/O adapters 4 whose time slices compared activate one of the 16 I/O DATA bus 55 lines. Each line identifies the priority of an I/O adapter 4. An I/O adapter 4 with a priority of 0 will raise I/O DATA bus 55 line 0; and I/O adapter 4 with a priority of 15 will raise I/O DATA bus 55 line 15. Thus, up to 16 I/O adapters may request use of the channel 3 per time slice by activating an I/O DATA bus bit. The channel 3 loads the priority data from the I/O DATA bus 55 into the first two bytes of the CDR Register 50. The channel 3 then gates the first two bytes from the CDR Register 50 to the Priority Encode 52. As shown in greater detail in FIG. 13, the Priority Encode 52 determines which I/O adapter 4 on this time slice has the highest priority and is to be granted use of the channel 3. For example, if all of the bits are on, priority 0 would be loaded into the Priority Register 54, because I/O DATA bus bit 0 is the highest priority. If bits 3, 5 and 7 are on, a priority of 3 would be loaded in the Priority Register 54. If any priority bit is found to be on in the CDR Register 50, the channel 3 proceeds to the Channel Grant Sequence (described below) for the I/O adapter 4 with the highest priority among the bits. Note that the time slice of the I/O adapter 4 requesting use of the channel 3 remains in the Slice Counter Register 53 after the priority of the highest priority I/O adapter 4 is loaded into the Priority Register 54. These two four-bit registers (Slice Counter and Priority) together uniquely define the channel priority of an I/O adapter 4. Thus, a maximum of 256 different channel priorities are possible (16 time slices with 16 priorities per time slice), with the present priority mechanism.

FIG. 6 cycles 1 and 2 illustrates the timing of the Channel Poll Sequence as performed by the priority mechanism. In cycle 1, the channel 3 activates the TP and TD lines and gates the contents of the Slice Counter Register 53 on the I/O DATA bus 55, bits 0-3. In cycle 2, the channel 3 examines the I/O DATA bus 55 to determine if any I/O adapter 4 requested use of the channel 3 by activating the I/O DATA buss 55 line corresponding to its priority. If no I/O DATA bus 55 line is active, the channel 3 returns to cycle 1 and gates the next time slice value onto the I/O DATA bus 55. The timing of the channel's activities continuing beyond the Channel Poll Sequence when the channel 3 finds an I/O DATA bus 55 line active appears in connection with the description of the Channel Grant Sequence, next below.

Channel Grant Sequence—The Channel Grant Sequence is performed by the channel 3 to connect the channel interface to a particular I/O adapter 4 and then transfer data to or from the I/O adapter 4.

The channel 3 grants use of the channel interface to the particular I/O adapter 4 which has been identified by the Priority Encode 52 as having the highest priority. The grant begins by activating the GRANT and TP lines, gating the contents of the Slice Counter Register 53 on the first four bits of the I/O DATA bus 55 and gating the contents of the Priority Register 54 onto the second four bits of the I/O DATA bus 55.

All I/O adapters 4 which requested use of the channel 3 when their time slice compared during the initial poll sequence perform a compare on all eight bits on the I/O DATA bus 55 to determine if the channel 3 was granted to them. If the channel priority of a particular I/O adapter 4 does not compare, it has not been granted the channel 3 and will again request use of the channel 3 when the activated TP and TD lines and the time slice assigned to the I/O adapter 4 are seen by the I/O adapter 4. If the channel priority does compare, the I/O adapter 4 registering the compare will further participate in the Channel Grant Sequence as follows.

The channel 3 deactivates the TP line and activates the TD and GRANT lines to indicate to the granted I/O adapter 4 that the I/O adapter 4 should transfer the channel control field (CCF) to the channel 3. The CCF is a 2-byte field that the I/O adapter 4 transfers to the channel 3 over the I/O DATA bus 55 to inform the channel 3 of the function to be performed, i.e. a memory fetch, a memory store or an interrupt function. FIG. 4 shows the bit meaning of bytes 0 and 1 of the CCF. As seen from byte 0, the I/O adapter 4 has two basic options. It may be a memory request (bit 0=1) or an interrupt function event (bit 0=0). The interrupt functions available to the I/O adapter 4 are (1) Command End-/Fetch Next Command (everything worked correctly); (2) Command End (some type of error or exception occurred); (3) Allocate Page (place O's in a page for future use by an I/O adapter); and (4) Resolve Next Page (bring the next page referenced by the virtual address in an I/O register into memory). The handling of interrupt functions is explained below in the discussion of the I/O Interrupt Sequence. Byte 1 of the CCF specifies the particular register in the VAT I/O Registers 6 to be used when a memory fetch or memory store is called for. If an interrupt function is to be performed, the I/O adapter 4 specifies the code for an I/O command register in byte 1 of the CCF. For purposes of further discussion of the Channel Grant Sequence and, in particular, its role in permitting an I/O adapter 4 to delay acceptance of a command, a memory transfer CCF, involving the memory fetch of eight bytes of data which constitute a delayed command, will be described.

The I/O adapter 4 which was granted use of the channel 3 activates the VALID B (of VALID H) line to the channel 3 and places the first byte of the CCF on the I/O DATA bus 55. Because, by assumption, the I/O adapter 4 has used the delayed command acceptance option during the Start Device Sequence, i.e. the I/O adapter 4 did not take the command immediately and merely stored an indication of command pending, the I/O adapter 4 will send out a value of hexadecimal '80' as byte 0 of the CCF, specifying a memory fetch and incrementing the specified I/O register. The adapter 4 also activates the PREFETCH line (along with the VALID B line) to indicate that more than four bytes of data will be fetched from memory 5. The channel 3 places byte 0 of the CCF into byte 0 of the CDR Register 50. The I/O adapter 4 then specifies the code for the I/O command register for this adapter in byte 1 of the CCF, by placing this on the I/O DATA bus 55, and activates the EOC line to indicate that this is the last byte of the CCF. The channel 3 loads the I/O command register identifier into byte 1 of the CDR Register 50, and, because the EOC line is active, loads the first two bytes of the CDR Register 50 into the CCR Register 56. The control hardware of the channel 3 then uses the information in the CCR Register 56 to determine the function to be performed. Because by assumption, the function to be performed is a memory fetch, the channel 3 deactivates the TD line to signal the I/O adapter 4 that the data is not yet ready. The channel 3 then activates the I/O VAT REQUEST, INCREMENT, MEM FETCH and MEM ACCESS lines to the VAT 2. Following activation of these lines, the channel 3 specifies the particular I/O command register from byte 1 of the CCR Register 56 on the I/O REG SELECT bus 57 to the VAT 2. The VAT 2 selects the specified I/O command register and stores the contents of that register into the VAT Register 401. The VAT 2 then gates the address from the VAT Register 401 to the memory 5 and activates the MEMORY FETCH line to the memory 5. Following this operation, the VAT control 402 increments the specified I/O command register (in the VAT Register 401) value by four and stores the result back in the I/O command register. The memory control (not shown) fetches the data (the first four bytes of a command) from memory 5 and places the data in the CDR Register 50 via the MEMORY DATA bus 7.

In response to the MEM DONE line becoming active from the VAT 2, the channel 3 loads the data from the CDR Register 50 to the CDRB Register 51, activates the TD line and gates the first byte of data from the CDRB Register 51 onto the I/O DATA bus 55.

Because the PREFETCH line is active upon completion of the first memory fetch, the channel 3 starts a second memory fetch by activating the I/O VAT REQUEST, INCREMENT, MEM ACCESS and MEM FETCH lines and designating the same I/O command register as before to the VAT 2 on the I/O REG SELECT bus 57. The VAT 2 selects the specified I/O command register, loads the contents onto the VAT Register 401, increments the contents of the specified I/O command register by four and stores this back into the I/O command register. The VAT 2 then gates the (unincremented) address in the VAT Register 401 to the memory along with the MEMORY FETCH line. The memory control fetches four bytes of data (the second four bytes of the command) from memory 5 and gates this data over the MEMORY DATA bus 7 into the CDR Register 50. The VAT 2 then activates the MEM DONE line to the channel 3 to indicate that the VAT and memory cycles are complete.

While the channel 3 is prefetching the next four bytes of data from memory 5, the channel 3 also gates the first four bytes of data to the I/O adapter 4 over the I/O DATA bus 55. The I/O adapter 4 deactivates the PREFETCH line upon receiving the first byte of data, to indicate no additional memory fetches will be required. The channel next gates the second four bytes of the command to the I/O adapter 4. Upon receiving the eighth byte of the command, the I/O adapter 4 activates the EOC line to indicate no additional data is to be transferred. The channel 3, upon detecting the EOC line becoming active, deactivates the TD and GRANT lines and returns to the Channel Poll Sequence. The I/O adapter 4 deactivates the VALID B (or VALID H) and EOC lines.

In the assumed case the Channel Grant Sequence used a CCF for a memory fetch of a delayed command. However, the Channel Grant Sequence is essentially the same for a memory fetch of data which is not a command. The channel hardware makes no distinction between fetching a command or fetching data. The only difference is in the VAT I/O register designated by the I/O adapter 4 which, in the case of a delayed command, is an I/O command register. In the case of a normal data fetch (or store) an I/O data register would be specified. In either case, the I/O adapter 4 controls the number of bytes transferred during the Channel Grant Sequence and specifies whether a fetch or store is to be performed. Accordingly, an I/O adapter 4 which has stored an indication that a command is pending has means for sepcifying a memory fetch using an address in its I/O command register to cause the channel 3 to fetch from memory 5 the delayed command which the adapter now wishes to execute.

Figure 8:
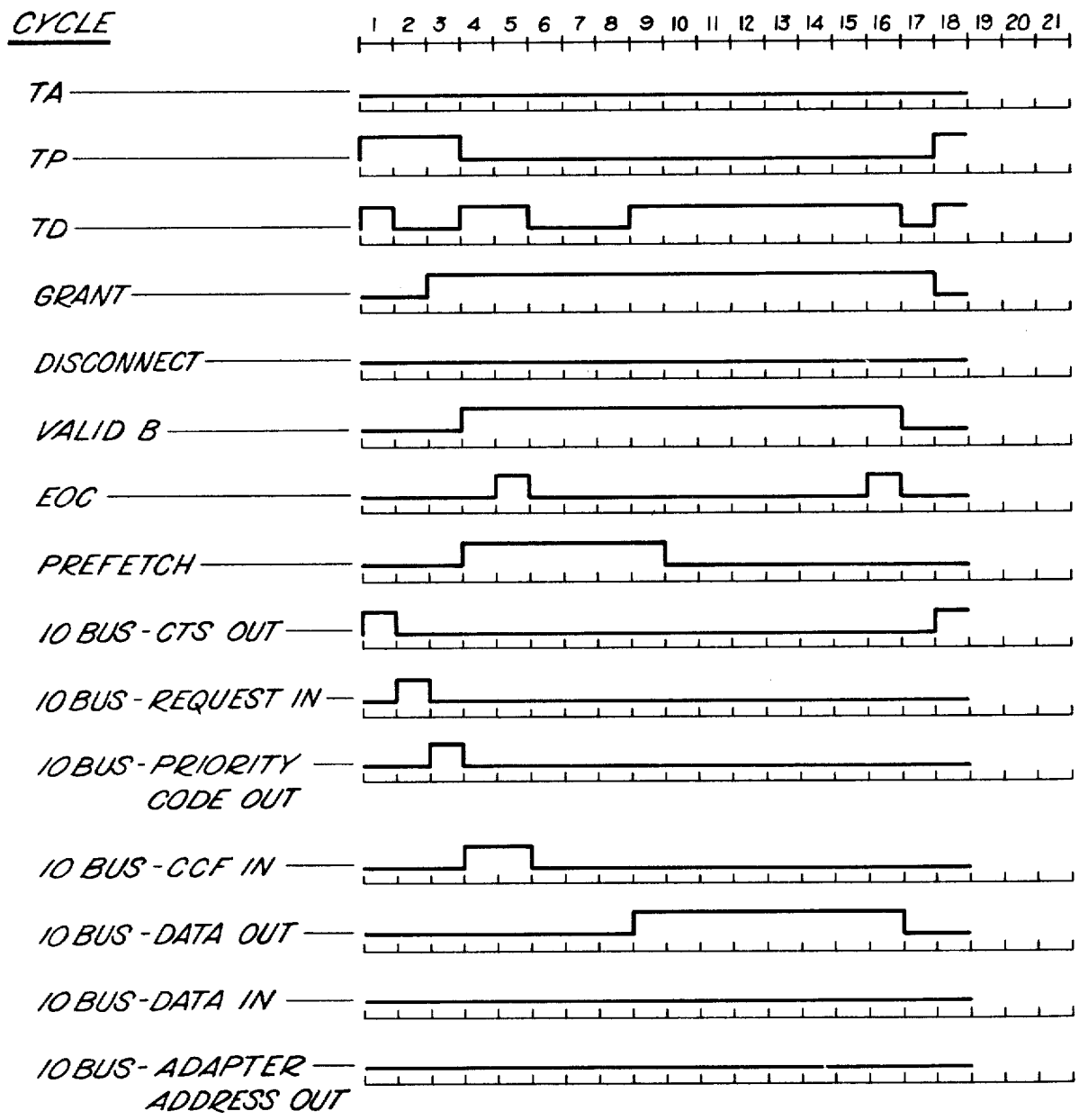
FIG. 8 is a timing diagram showing the timing of activation of various channel interface lines during a Channel Grant Sequence in which the I/O adapter fetches an eight-byte delayed command from memory.

FIG. 8 is a timing diagram of the previously-described fetch from memory of an eight byte delayed I/O command. During cycle 1 the channel 3 polls the I/O adapters 4 with a four-bit time slice value on the I/O DATA bus 55. In cycle 2, the I/O adapters 4 which recognize their time slice request use of the channel 3 by setting one or more of the I/O DATA bus 55 bits on. In cycle 3 the channel 3 grants use of the channel interface to the requesting I/O adapter 4 with the highest priority, by activating the TP and GRANT lines and placing the full time slice priority code of the highest priority I/O adapter 4 on the I/O DATA bus 55. In cycle 4 the channel 3 deactivates the TP line and activates the TD and GRANT lines to indicate to the granted I/O adapter 4 that the channel 3 is ready to receive the CCF. In cycle 4 the I/O adapter 4 activates the VALID B (or VALID H) and PREFETCH lines and gates byte 0 of the CCF onto the I/O DATA bus 55. In cycle 5 the I/O adapter 4 designates its associated I/O command register in byte 1 of the CCF on the I/O DATA bus 55 and activates the EOC line to indicate that this is the end of the CCF.

Because, in this example, the CCF specifies a memory fetch, the channel 3 in cycle 6 deactivates the TD line to indicate to the I/O adapter 4 that the channel 3 has not yet fetched the data from memory 5. The channel 3 then fetches the data (in this example, the first four bytes of a command) from memory 5 in cycles 6, 7 and 8 using the I/O command register that the I/O adapter 4 designated in byte 1 of the CCF. The data from memory 5 is loaded into the CDR register 50 in cycle 8; byte 0 is sent on I/O DATA bus 55 in cycle 9. Because the PREFETCH line is active in cycle 9, the channel 3 fetches the next four bytes of the command from memory 5 in cycles 9, 10 and 11. The channel 3 transfers the second, third and fourth bytes of the command to the I/O adapter 4 during cycles 10, 11 and 12. In cycle 10, the I/O adapter 4 deactivates the PREFETCH line, after receiving the first byte of the command. In cycle 11, the second four bytes of the command from memory 5 are stored in the CDR Register 50. In cycle 13, the CDR Register 50 is loaded into the CDRB Register 51 and the fifth byte of data is transferred to the I/O adapter 4. The channel 3 then transfers the sixth, seventh, and eighth bytes of the command to the I/O adapter 4 in cycles 14, 15 and 16. In cycle 16, the I/O adapter 4 activates the EOC line to indicate that no more data is to be transferred. In cycle 17 the channel 3 deactivates the TD line, and in cycle 19 it goes back to the Channel Poll Sequence.

I/O Interrupt Sequence—When an I/O adapter 4 has completed processing a command from the CPU 1, the I/O adapter 4 requests use of the channel 3 in the same manner as in the Channel Poll Sequence described above. The purpose of the request is to permit the I/O adapter 4 to report the outcome of its processing of the command. The channel 3 grants use of the channel interface to an I/O adapter 4 by raising the GRANT and TP lines and placing the channel priority of the I/O adapter 4 having the highest priority onto the I/O DATA bus 55. The I/O adapter 4 then compares the channel priority on the I/O DATA bus 55 with its assigned priority. An adapter 4 which finds a match with its assigned priority is granted the channel 3.

After placing the channel priority on the I/O DATA bus 55, the channel 3 deactivates the TP line and activates the TD and GRANT lines to indicate to the I/O adapter 4 that the channel 3 is ready to receive the CCF. The I/O adapter 4 then activates the VALID B (or VALID H) line and places byte 0 of the CCF on the I/O DATA bus 55. If the command completed successfully, the I/O adapter 4 will place a value of hexadecimal '01' (Function Event—Command End/Fetch Next Command) on the I/O DATA bus 55. If an error was detected, or an exception occurred, the I/O adapter 4 will place a value of hexadecimal '02' (Function Event—Command End) on the I/O DATA bus 55. (See FIG. 4). The channel 3 stores the data from the I/O DATA bus 55 into the first byte of the CDR Register 50. Next, the I/O adapter 4 designates its associated I/O command register by placing its code number on the I/O DATA bus 55. The channel 3 stores this code into the second byte of the CDR Register 50. The I/O adapter 4 then proceeds to place two more bytes of status information on the I/O DATA bus 4. These status bytes only have meaning when a Command End (hexadecimal '02' in byte 0) is sent to the channel 3. The status bytes define the type of error or exception. The channel 3 stores the two status bytes in the third and fourth bytes of the CDR Register 50. The data in the CDR Register 50 is then loaded into the CDRB Register 51. As the I/O adapter 4 transfers the second byte of status information, the EOC line is activated to indicate that the transfer is complete. Upon detecting the EOC line, the channel 3 deactivates the TD line.

Because the function event sent by the I/O adapter 4 signals termination of processing of an I/O command, the channel 3 sets the Valid Page bit off in the specified I/O command register, to prevent the I/O adapter 4 from referencing memory 5 with this I/O register. To do this, the channel 3 activates the I/O VAT REQUEST and INVALIDATE PAGE lines to the VAT 2 and designates the I/O command register specified in the CCF to the VAT 2 on the I/O REG SELECT bus 57. The VAT 2, in response to the I/O VAT REQUEST and INVALIDATA PAGE lines being active, selects the specified I/O command register, resets its Valid Page bit to invalid and stores the modified contents back into the I/O Command register, using the VAT Register 401. The VAT 2 then activates the MEM DONE line to the channel 3 indicating that the VAT cycle is complete.

Because the interrupt function is to be sent on to the CPU 1 which issued the original I/O command, the channel 3 activates the I/O VAT REQUEST, MEM ACCESS and INCREMENT lines to the VAT 2. The channel 3 then designates the Event Stack Register to the VAT 2 on the I/O REG SELECT bus 57. By convention, the Event Stack Register points to the I/O Event Stack (not shown) in memory 5 which handles all communication from the channel 3 to the CPU 1. The channel 3 stores the function event on the I/O Event Stack and increments the contents of the Event Stack Register by four, using the VAT Register 401. At some later time, the CPU 1 will retrieve this event from the I/O Event Stack, decrement the Event Stack Register by four, and process the event as required.

The specific steps in storing the function event on the I/O Event Stack are as follows. The VAT 2 selects the Event Stack Register and loads the address from this register into the VAT Register 401. The VAT 2 gates this address to the memory 5 and activates the GATE MEM DATA line to the channel 3, causing the channel 3 to gate the four bytes of data specifying the function event from the CDRB Register 51 onto the MEMORY DATA bus 7. The memory control then stores the data found on the MEMORY DATA bus 7 into memory 5 at the address specified in the Event Stack Register. The VAT 2 increments the contents of VAT Register 401 by four and stores the result back into the Event Stack Register. The VAT 2 next activates the MEM DONE line to the channel 3, indicating that the VAT and memory cycle is complete. The channel 3 activates the SET EX BIT 8 line to the CPU 1 which causes bit 8 in the EX Register in the CPU 1 (FIG. 1) to be set on. This bit being on indicates to the CPU 1 that the channel 3 has placed data on the I/O Event Stack. The CPU 1 interrogates this bit periodically. When the CPU 1 finds the bit on, it removes and processes all of the events from the I/O Event Stack.

Figure 5:
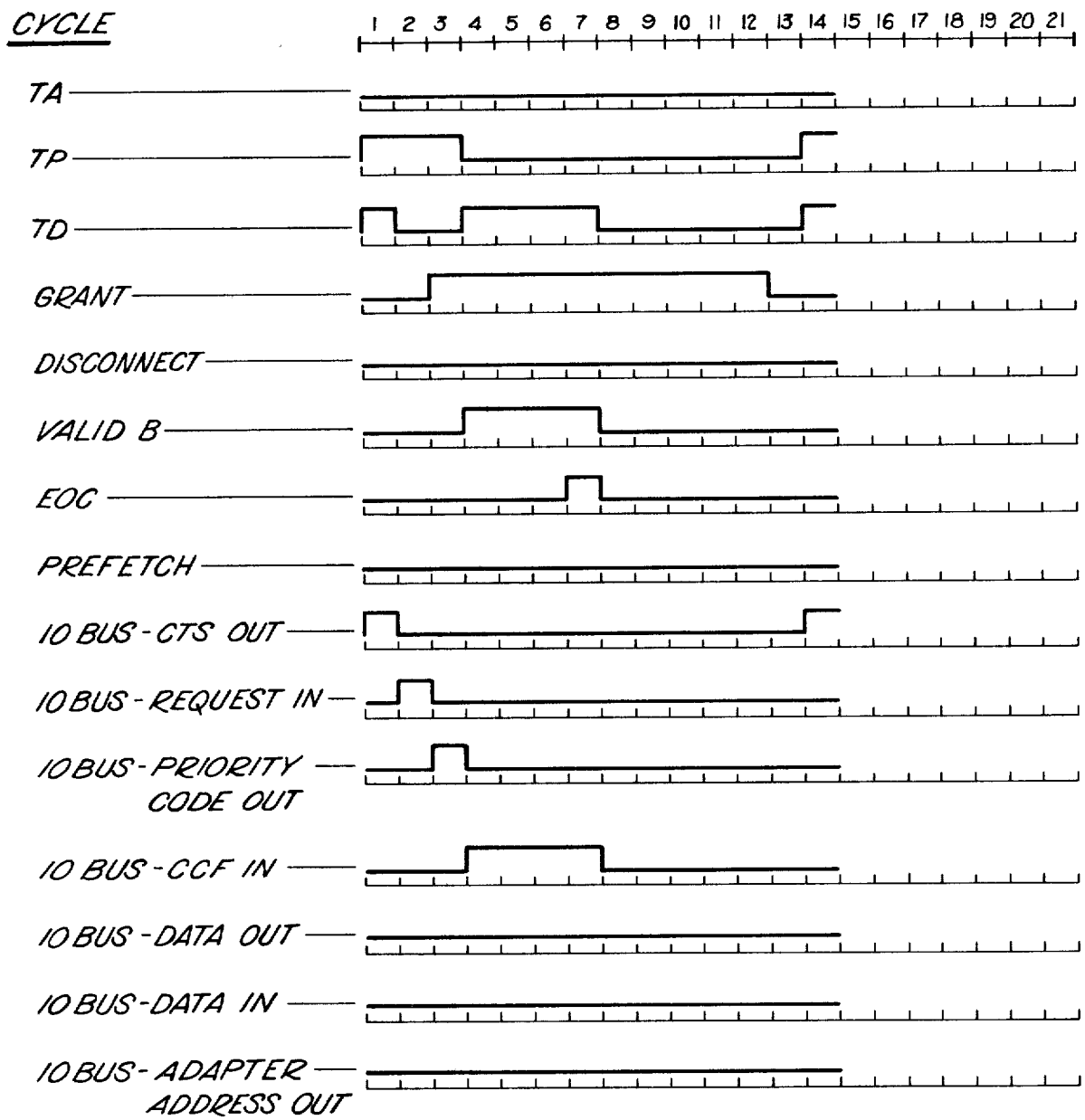
FIG. 5 is a timing diagram showing the timing of activation of various channel interface lines during an I/O Interrupt Sequence.

FIG. 5 is a timing diagram for the channel interface when performing an I/O Interrupt Sequence. In cycles 1, 2 and 3, the channel 3 polls the I/O adapter 4, the I/O adapter 4 requests use of the channel 3 and the channel 3 is granted to the I/O adapter 4. In cycle 4 the I/O adapter 4 gates the channel function code field ('01' for Command End/Fetch Next Command or '02' for Command End) onto the I/O DATA bus 55 and activates the VALID B (or VALID H) line. The channel 3 activates the TD line to indicate that the byte was received. The I/O adapter 4 then transfers a byte specifying its associated I/O command register and two bytes of status information in cycles 5, 6 and 7. In cycle 7, the I/O adapter 4 activates the EOC line to indicate that this is the end of the four-byte function event field. In cycle 8 the channel 3 deactivates the TD line and the I/O adapter 4 deactivates the VALID B (or VALID H) and EOC lines. The channel 3, in turn, resets the Valid Page bit in the specified I/O command register in cycles 8 and 9. In cycle 10 the channel 3 gates the data from the CDR Register 50 to the CDRB Register 51. In cycles 11 and 12, the channel 3 stores the data from the CDRB Register 51 into the I/O Event Stack using the Event Stack Register. In cycle 13, the channel 3 activates the SEX EX BIT 8 line to set EX Register bit 8 on in the CPU, indicating that an event was placed on the I/O Event Stack. The channel 3 then returns to the Channel Poll Sequence in cycle 14.

I/O Page Crossing Sequence—When an I/O adapter 4 fetches data from or stores data to memory, the data address used by the I/O adapter 4 is incremented (or decremented) by four (depending on the type of I/O device being serviced) by the VAT control 402. Each I/O adapter 4 can reference data within a page (512 bytes) without complication, but once the I/O data register pointing to the data in incremented or decremented outside of this range, the CPU 1 must load a new address into the I/O register which points to the next piece of data on another main storage page. The addresses used by the I/O adapters 4 are virtual addresses in the sense that the data is referenced as if the data were always located sequentially in memory. Actually, the data is segmented into 512-byte pages, each of which may be in main storage (memory 5) or may be stored in secondary storage at any given time. Thus, the data is not sequential in a physical sense, and to reserve enough pages in memory 5 to make it physically sequential would be a waste of resources. Accordingly, an I/O adapter 4 can be given the ability to use virtual addresses, but the CPU 1 and VAT 2 must carry the responsibility for directing the adapter 4 to the next page of real storage, when the adapter 4 reaches a page boundary.

A page crossing is normally recognized each time an I/O address rgister (data address or command address) is incremented beyond the 512-byte range of a page. (In certain cases where there will be no memory access using the incremented address, the page crossing need not be recognized and will be ignored.) The page crossing condition must be recognized, because, within a page, I/O addresses can be incremented as if all of virtual memory were physically sequentially in main storage; however, at page boundaries the assumption of physically sequential memory breaks down, and the incremented address is no longer valid. To obtain a new valid address for an I/O adapter 4 which encounters a page crossing, the system must translate the incremented address into a resolved, real memory address. Once this new address is placed in the specified I/O address register, the I/O data transfer interrupted by the page crossing can be resumed. As a means of indicating the valid/invalid status of the addresses in I/O address registers, the VAT control 402 sets and resets the Valid Page bits associated with the registers. The Valid Page bit associated with a particular I/O address register is set off when the associated I/O adapter 4 crosses a page boundary and is set back on when the new, resolved address is loaded in the specified I/O register. As will be described below in the discussion of the I/O Disconnect Sequence, the status of the Valid Page bit is tested by the VAT control 402 at the start of processing of an I/O-originated memory request. If the Valid Page bit is off, the requesting adapter is disconnected or held in a disconnected state, so that other I/O adapters on the same time slice can be serviced. When the Valid Page bit is found on, the disconnect is terminated.

The means for detecting when a page boundary is reached is found in the VAT control circuitry 402, used to increment the contents of the various VAT I/O Registers 6. Because the address in each of these registers is a real address when the Valid Bit is on, each address corresponds to a particular byte in main memory 5. Typically the first byte on a page in main memory 5 is assigned an address number which is evenly divisible by the number of bytes in a page, 512 or $2^9$. Thus, incrementing the address off the end of the page will result in a carry from the ninth bit in the address to the tenth bit. Accordingly, the page crossing can be detected by monitoring the ninth and tenth bits, to see when a carry occurs. A more detailed disclosure of such a mechanism used for detecting a page crossing can be found in the copending, commonly-assigned patent application titled "Address Translation Apparatus", Ser. No. 925,490, filed July 17, 1978, naming as inventors Roy L. Hoffman, et al issued as Pat. No. 4,218,743.

Figure 9:
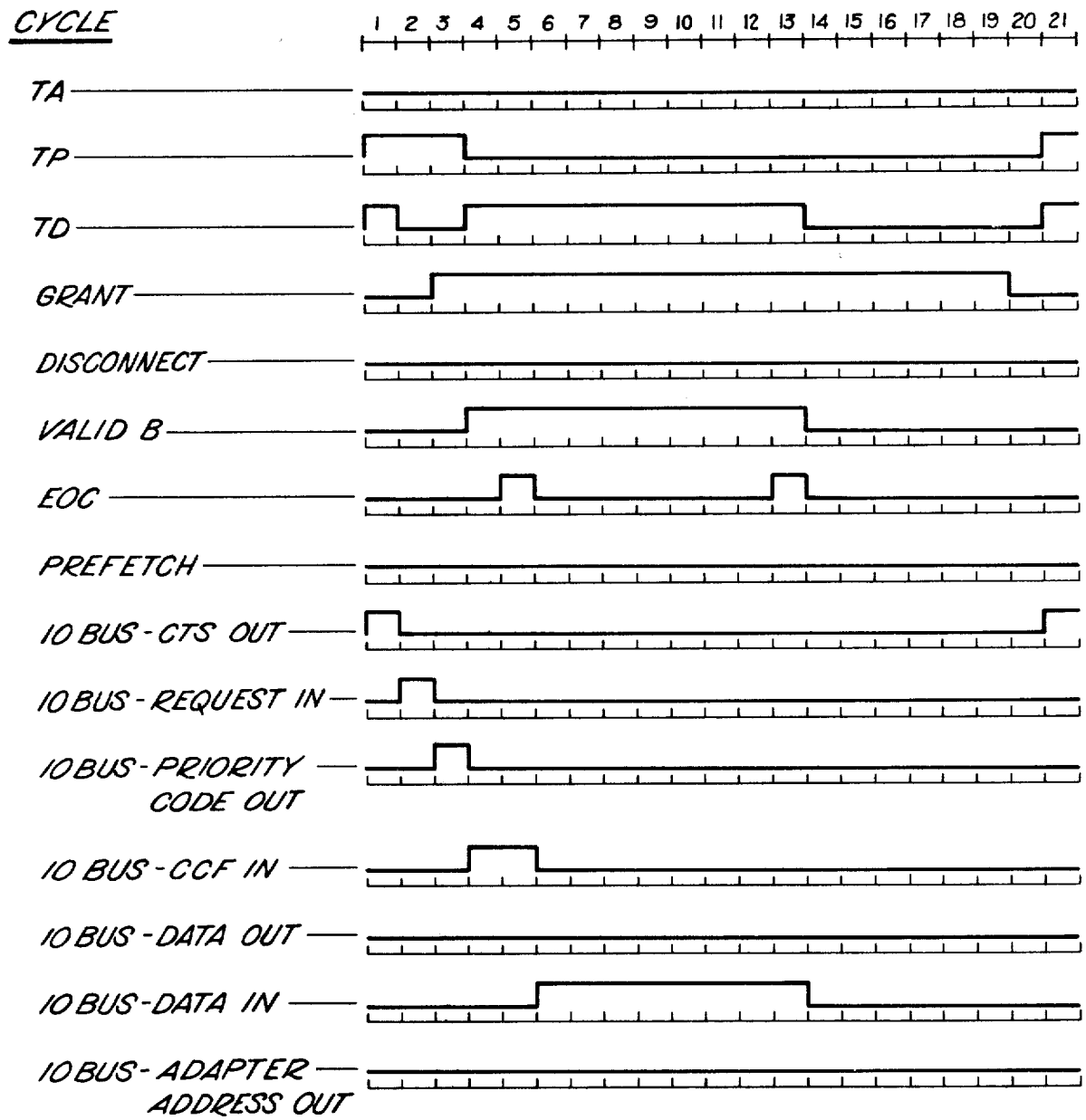
FIG. 9 is a timing diagram showing the timing of activation of various channel interface lines during an I/O Page Crossing Sequence occurring as a result of a store into memory.

FIG. 9 is the timing diagram for a store into memory in which the boundary of a 512-byte page is crossed. In cycles 1, 2 and 3, the channel 3 polls the I/O adapter 4 to determine if the I/O adapter 4 requires use of channel interface. The I/O adapter 4 requests the use of the channel interface and the channel 3 grants use of the channel interface to the I/O adapter 4. In cycles 4 and 5 the I/O adapter 4 transfers the CCF to the channel 3. Because, by assumption, the I/O adapter 4 is performing a memory store, the I/O adapter 4 sends a hexadecimal 'AO' as byte 0 of the CCF. Byte 1 of the CCF specifies an I/O data register associated with the adapter 4. Both bytes of the CCF are stored in the CCR Register 56. In cycle 5 the I/O adapter 4 activates the EOC line to indicate the end of the CCF. In cycles 6, 7, 8 and 9 the I/O adapter 4 transfers the first four bytes of data to the channel 3 and the channel 3 stores this data in the CDR Register 50. In cycle 10, the channel 3 stores the data in the CDR Register 50 into the CDRB Register 51, activates the I/O VAT REQUEST, MEN ACCESS and INCREMENT lines to the VAT 2 and gates the I/O data register specification from byte 1 of the CCR Register 56 to the VAT 2. The VAT 2 selects the specified I/O data register, loads the contents of that register (an address) into the VAT register 401 and gates the address to the memory 5. The VAT 2 then activates the GATE MEN DATA line to the channel 3, causing the channel 3 to gate the data in the CDRB Register 51 to the MEMORY DATA bus. The memory control stores the data into memory 5 in cycle 11. The VAT 2 next increments the contents of the VAT Register 401 by four and stores the modified value back into the specified I/O data register. The VAT 2 then activates the MEM DONE line to the channel 3.

In cycles 10, 11, 12 and 13 the I/O adapter 4 transfers four more bytes of data to the channel 3. The channel 3 stores these bytes of data in the CDR Register 50. In cycle 13, the I/O adapter 4 activates the EOC line to indicate that no more data will be transferred during this Channel Grant Sequence. If the EOC line were not activated, the I/O adapter 4 could continue to store data. In cycle 14, the channel 3 deactivates the TD line in response to the EOC line becoming active. The I/O adapter 4 deactivates the VALID B (or VALID H) and EOC lines. The channel 3 then loads the data from the CDR Register 50 the CDRB Register 51, actives the I/O VAT REQUEST, MEM ACCESS and INCREMENT lines to the VAT 2, and specifies its I/O data register to the VAT 2. The VAT 2 selects the specified I/O data register, loads the address in that register into the VAT Register 401, and gates the address to memory 5. The VAT then activates the GATE MEM DATA line to the channel 3, causing the data from the CDRB Register 51 to be gated to the MEMORY DATA bus 7. The memory 5 then stores the data from the MEMORY DATA bus 7 into memory 5 at the address found in the VAT Register 401. The VAT 2 next increments the contents of the VAT Register 401 by four and, because detecting means in the VAT control 402 detect that the incremented address crosses a page boundary (512 bytes), the VAT 2 sets the Valid Page bit in the contents of the VAT Register 401 off. The VAT 2 stores the modified address and Valid Page bit back into the specified I/O data register. The VAT 2 next activates the PAGE CROSSING and MEM DONE lines to the channel 3 in cycle 15. In response to the MEM DONE and PAGE CROSSING lines becoming active, the channel 3 forms an address event, consisting of four bytes, in the CDRB Register 51. This event will be sent to the CPU 1 to inform the CPU 1 that an I/O address register has been incremented outside a page boundary, requiring that a new address be loaded into the I/O register, In cycle 16, the channel 3 gates the contents of the CCR Register 56 (containing the CCF) to the first two bytes of the CDR Register 50. The second two bytes of the CDR Register 50 are loaded with 0's. The contents of the CDR Register 50 are loaded into the CDRB Register 51 in cycle 17.

In cycles 18 and 19, the channel 3 activates the I/O VAT REQUEST, MEM ACCESS and INCREMENT lines, and specifies the Event Stack Register to the VAT 2. The VAT 2 selects the Event Stack Register, loads the address from the Event Stack Register into the VAT Register 401 and gates the address to the memory 5. The VAT 2 then activates the GATE MEM DATA line to the channel 3 causing the four-byte address event in the CDRB Register 51 to be gated to the MEMORY DATA bus 7. The memory control stores the address event on the I/O Event Stack. The VAT 2 increments the contents of the VAT Register 401 by four and stores the result back in the Event Stack Register. The VAT 2 activates the MEM DONE line to the channel 3 to indicate completion of the VAT and memory cycle.

In cycle 20, the channel 3 activates the SET EX BIT 8 line to the CPU 1 to set on bit 8 in the EX Register indicating than an event has been placed on the I/O Event Stack. The channel 3 returns to the Channel Poll Sequence in cycle 21. when the CPU 1 detects that EX Register bit 8 is on, the CPU 1 fetches the event from the I/O Event Stack using the Event Stack Register and decrements the contents of the Event Stack Register by four. The CPU 1 determines that the event is an address event, because bit 0 is on in byte 0 of the Event Stack entry. An interrupt function would have this bit off. Having determined this, the CPU 1 reads the contents of the I/O data register (the address leading to the page crossing) specified in the byte 1 of the address event. This is the incremented address which must be translated into a real memory location. The CPU 1 locates the new real memory location associated with the address in the specified I/O data register and loads this new address into the I/O data register, with the Valid Page bit set on. A means for translating the incremented address by locating the new real storage location is described in the copending, commonly-assigned patent application titled "Address Translation Apparatus," Ser. No. 925,490, filed Jul. 17, 1978 issued as U.S. Pat. No. 4,218,743, naming as inventors Roy L. Hoffman et al.

Because the data referenced by the address in the specified I/O register may not be in memory yet, the CPU 1 may have to fetch the data from secondary storage of some other source, before the address can be resolved. This will be handled by the operating system's paging supervisor. Once the data is brought into memory 5, then the CPU 1 can load the translated memory address in the specified I/O data register (using the busses 15, 58 and 91, the VAT Register 401 and the CPU REQ line) and set the Valid Page bit on, signaling the completion of translation to the channel 3.

I/O Disconnect Sequence—An I/O Disconnect Sequence occurs when an I/O adapter 4 attempts to transfer data to or from memory and the Valid Page bit is off in the I/O address register specified in the CCF. This sequence causes the channel 3 to inform the I/O adapter 4 that the virtual address has not yet been resolved; therefore, the I/O adapter 4 must retry transferring the data at a later time. This sequence also takes steps to prevent an I/O adapter 4 from tieing up the channel 3 until the virtual address has been resolved by providing a corresponding main storage address. Those objectives are accomplished by disconnection means in the channel 3, particularly Priority Encode 52, which cause the priority of the I/O adapter 4 which encounters the Valid Page bit off to be ignored, thereby permitting servicing of I/O adapters of lower priority on the same time slice.

Figure 10:
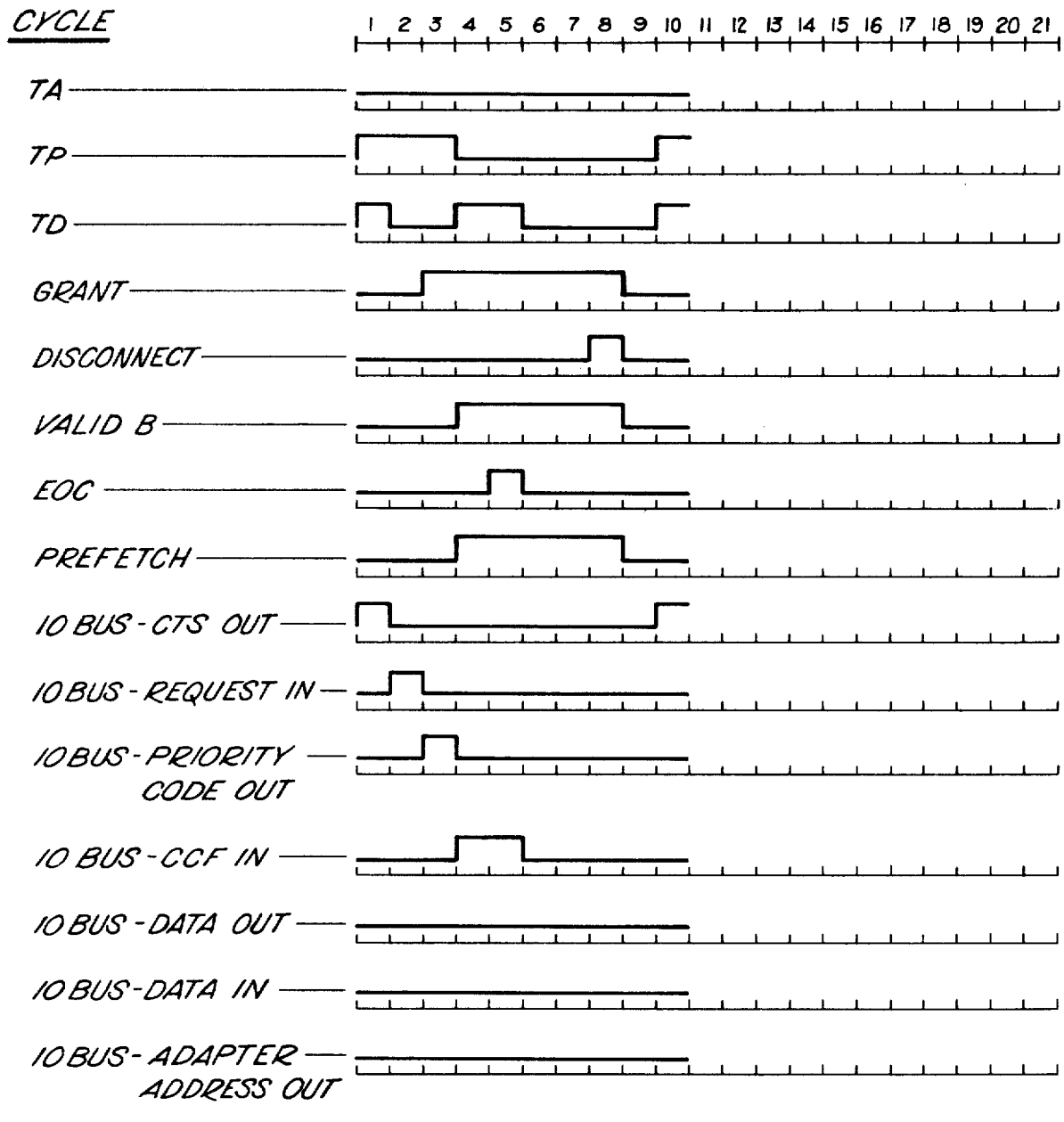
FIG. 10 is a timing diagram showing the timing of activation of various channel interface lines during an I/O Disconnect Sequence occurring during a fetch of data from memory.
Figure 11:
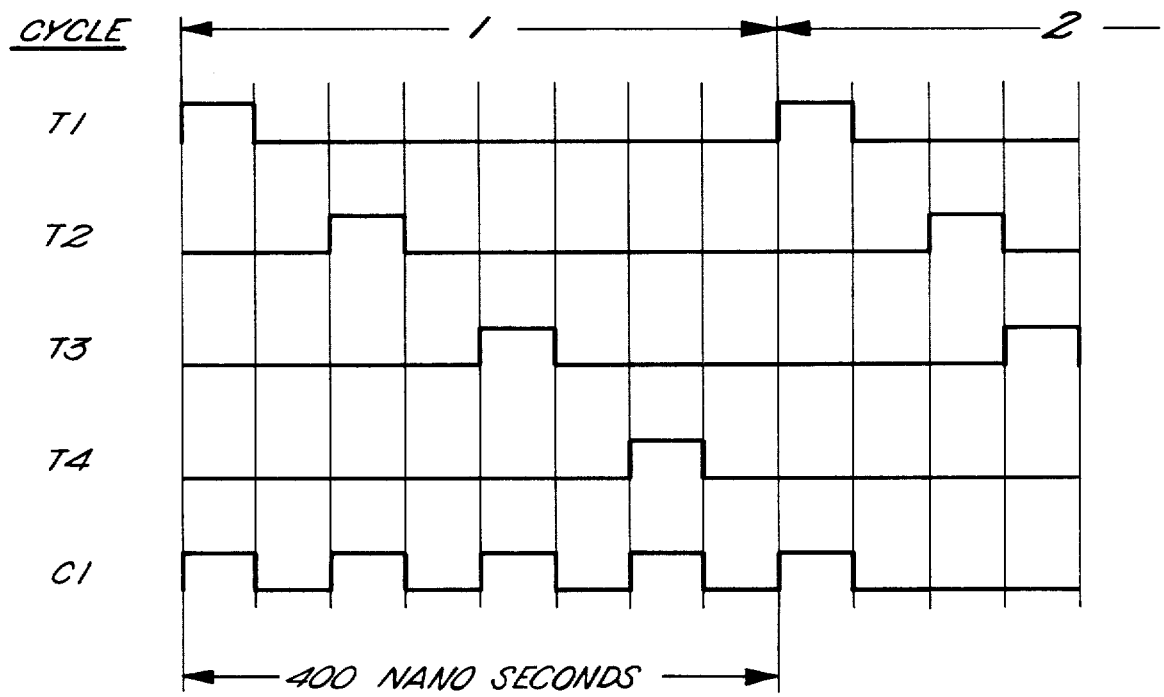
FIG. 11 is a timing diagram showing the relative timing of the five time clocks transmitted from the CPU to the channel C1, T1, T2, T3 and T4.

FIG. 10 is the timing diagram of a I/O Disconnect Sequence using as an example a fetch of data from memory by the I/O adapter 4, attempted after a page crossing has been encountered and the Valid Page bit in the adapter's associated I/O register is turned off, in accordance with the I/O Page Crossing Sequence described above.

In cycles 1, 2 and 3 the channel 3 polls the I/O adapters 4 for any requests. An I/O adapter 4 requests use of the channel 3 and is granted use of the channel interface.

In cycles 4 and 5 the I/O adapter 4 transfers of CCF to the channel 3. Because the I/O adapter 4 has specified a memory fetch in the CCF, the channel 3 deactivates the TD line in cycle 6 indicating that the channel 3 has not yet fetched the data from memory 5. The channel 3 then activates the I/O VAT REQUEST, MEM ACCESS, MEM FETCH, and INCREMENT lines to the VAT 2 and specifies the I/O data register from byte 1 of the CCR Register 56, which holds byte 1 of the CCF.

The VAT 2 selects the specified I/O data register and loads the contents of the I/O data register into the VAT Register 401. However, when the VAT 2 fetches the contents of the I/O data register, the Valid Page bit is tested by the VAT control 402 and is found to be off. This causes the VAT 2 to terminate the memory request by activating the MEM DONE and INVALID PAGE lines to the channel 3 in cycle 7. When the channel 3 detects the MEM DONE and INVALID PAGE lines, the channel 3 activates the DISCONNECT line to the I/O adapter 4 in cycle 8. The I/O adapter 4, upon detecting the DISCONNECT line becoming active, deactivates the VALID B (or VALID H) line and terminates the Channel Grant Sequence in cycle 9. The channel 3 returns to the Channel Poll Sequence in cycle 10.

The channel does not, however, return to polling time slice 0 or the next succeeding time slice. Instead, it polls the same time slice that caused the DISCONNECT line to become active. If any requests from I/O adapters 4 are found on this time slice (the I/O adapter that was disconnected may again request use of the channel interface), the channel 3 proceeds with the Channel Grant Sequence. In doing so the channel 3, by means of the Priority Encode 52, ignores the priority of the adapter that caused the disconnect in the previous poll sequence. Thus, the disconnection means holds the previously disconnected I/O adapter in its disconnected state, preventing it from locking out lower priority adapters on the same time slice. If there are no requests from I/O adapters 4, the channel 3 increments the Slice Counter Register 53 and continues to poll the rest of the time slices.

Channel Error Sequence—Channel errors fall within three groups—sequence errors, parity errors, and command errors. Sequence errors are caused by the I/O adapter 4 transferring too many or too few CCF bytes, activating channel interface lines at improper times, or failing to activate a line. Because certain sequence errors involve timing, a channel timer is used to check the amount of time an I/O adapter 4 is permitted to be on the channel interface.

Parity errors which occur on multiple-bit busses can be detected by both the channel 3 and I/O adapter 4. If the I/O adapter 4 detects a parity error on the I/O DATA bus from the channel, the I/O adapter 4 activates the ERROR line to the channel 3, causing the channel 3 to register a channel error. If the channel 3 itself detects bad parity in the contents of the CDR Register 50, loaded with data from memory 5 or from the I/O adapter 4, the channel 3 will also register a channel error.

Command errors are caused by the I/O adapter 4 transferring an invalid CCF to the channel. As seen in FIG. 4, only certain CCF bit combinations have meaning; other bit combinations are treated as errors. For example, if bit 0 of the first byte of the CCF is on, then bits 4-7 of the first byte must be 0. If bit 0 of the first byte of the CCF is off, then bits 1-7 must specify a valid function event. A CCF consisting of hexadecimal '8100' would cause a command error.

The channel 3 includes means for indicating the occurrence and type of channel errors in these three groups. In general, these means include circuitry which responds to various lines or bits which characterize the error and the surrounding circumstances, to produce channel error codes identifying the type of error. When a channel error of any of these three types is detected, means responsive to the occurrence of the error forms a four-byte channel error event field. The first 2 bytes of the channel error event are formed from the contents of the CCR0 and CCR1 Registers 56A, 56B. These two registers contain the two-byte CCF sent by the I/O adapter 4 to the channel 3. The first byte contains a channel function field consisting of bits specifying the control function, i.e., memory request, increment, decrement, fetch, store, or function event, and the second byte specifies the VAT I/O register to be used for the function.

The third byte of the channel error event is generated from the four-bit Slice Counter Register 53 and the four-bit Priority Register 54. The contents of these two registers at a given time are a priority code which uniquely identifies the I/O adapter 4 connected to the channel interface.

The fourth byte of the channel error event consists of an error code defining the type of error and reason for the error, e.g., memory error, parity error from I/O adapter 4, sequence error from I/O adapter 4.

The channel error event may be viewed as consisting of four fields, each one byte in length. The first byte is the channel function field. The second byte is a first identification field, identifying the I/O register in use at the error. The third byte is a second identification field identifying the I/O adapter. The fourth byte is a third identification field for identifying the type of error. The channel error event, after being formed from these four fields, is stored by the channel 3 onto the I/O Event Stack using the Event Stack Register. The CPU 1 removes the error event from the I/O Event Stack and performs error recovery operations.

As a more specific example of how the data flow functions when a channel error is generated, assume a parity error is detected by the I/O adapter 4 during the transfer of data from the channel 3 to the I/O adapter 4. Such an error could be due to noise on the channel interface.

Before the error is encountered, the channel 3 will have performed a Channel Poll Sequence and started a Channel Grant Sequence, as described above. However, during the Channel Grant Sequence, the I/O adapter 4 detects bad parity on the channel interface. When this occurs, the I/O adapter 4 activates the ERROR line to the channel 3 causing the channel 3 to generate an error code indicating that the I/O adapter 4 detected bad parity. This error code is stored in the Channel Error Register 75 in the Channel Control 60 (FIG. 2). The channel 3 activates the HALT line to the I/O adapter 4, indicating that the channel 3 has recognized the ERROR line being active. The I/O adapter 4 deactivates the ERROR line and all its other interface lines that are active. The I/O adapter 4 then waits for a new command to be sent from the CPU 1.

After the channel 3 activates the HALT line, the channel 3 gates the contents of the two-byte CCR Register 56 into the four-byte CDR Register 50, bytes 0 and 1. The channel 3 also gates the contents of the four bit Slice Counter Register 53 and the four bit Priority Register 54 (plus a parity bit) into the CDR Register 50, byte 2. The channel error code from the Channel Error Register 75 is gated into the CDR Register 50, byte 3. The channel 3 next gates the full, four-byte channel error event from the CDR Register 50, bytes 0-3, into the CDRB Register 51, bytes 0-3.

To store the contents of the channel error event on the I/O Event Stack, the channel 3 activates the I/O VAT REQUEST, MEM ACCESS, and INCRE- MENT lines to the VAT 2 and selects the Event Stack Register designation (a hexadecimal '00') to be gated onto the I/O REG SELECT bus 57.

The VAT 2 selects the contents of the Event Stack Register (the I/O Event Stack address) and places this address into the VAT Register 401. The VAT 2 increments this address by four and stores the incremented value back into the Event Stack Register. The VAT 2 gates the unincremented address in the VAT Register 401, to the memory 5 and activates the MEMORY STORE line. The VAT 2 also activates the GATE MEM DATA line to the channel 3, causing the data from the CDRB Register 51 to be gated to the MEMORY DATA bus 7. The memory control stores this data into the memory 5. The VAT 2 then activates the MEM DONE line to the channel 3, indicating that the VAT and memory cycle has completed.

In response to the MEM DONE line becoming active, the channel 3 checks to determine whether any memory error occurred during the store of the channel error event on the I/O Event Stack. If an error occurred, the channel 3 goes to a stop state in which no I/O adapter 4 can use the channel 3. The channel 3 also activates in SET EX BIT 9 line to the CPU 1, causing bit 9 in the CPU's EX Register to be set, indicating that the channel 3 has encountered a secondary error and that the CPU 1 must determine what caused the error and restart the channel 3. To restart the channel 3, the CPU 1 loads a code into the EO Register in the channel control 60 by means of the LOAD EO line and the EO DATA bus. The channel 3 again attempts to log the channel error onto the I/O Event Stack. If an error occurs again, bit 9 in the EX Register is again set via the SET EX BIT 9 line, and the channel 3 goes into a stop state, with no further activity.

If no error occurs when the channel error event is stored on the I/O Event Stack, the SEt EX BIT 8 line to the CPU 1 is activated, and the channel 3 checks the interface lines from the I/O adapters 4 to determine if any line is active. If any line is still active, the channel 3 starts the channel timer 955, a nine-bit counter. If the channel timer 955 reaches a predefined timer limit (corresponding to counter overflow), the channel 3 generates another channel error event indicating that an interface line is locked in an active state. This channel error event is formulated and logged onto the I/O Event Stack in the same manner as the previous channel error event. If no interface line is found to be active, the channel 3 returns to the Channel Poll Sequence.

It should be noted that the HALT line is used by the channel 3 to terminate immediately any function being done by the I/O adapter 4. Only the I/O adapter 4 which has been granted use of the channel 3 recognizes the HALT line. All other I/O adapters 4 ignore the line unless they are granted use of the channel 3 while the line is active. Accordingly, a typical channel error only causes the I/O adapter 4 connected to the channel interface at the time of the error to be halted, because the HALT line is cleared before another I/O adapter 4 is polled.

When the CPU 1 detects that bit 8 or bit 9 of the EX Register has been set, the CPU 1 fetches the channel error event from the I/O Event Stack and decrements the I/O Event Stack address pointer in the Event Stack Register by four. To distinguish a channel error from any other I/O event on the I/O Event Stack, the channel 3 will have forced bit 1 in byte O of the channel error event on. Any function or address event in the I/O Event Stack will have this bit set off. When the CPU 1 detects that the event is a channel error, the CPU 1 uses the priority code in byte 2 of the channel error event as an index into a table. The table contains the memory address of a listing of the valid VAT I/O register associated with the priority code, plus the address of the routine that controls the I/O adapter 4. The CPU 1 compares the I/O register specified in byte 1 of the channel error event with the listed valid VAT I/O registers associated with the priority code. If a match occurs, then the routine controlling the I/O adapter 4 is informed that a channel error has occurred.

Channel Error Sequence — Hardware Description

The hardware logic implementing the present invention is shown in greater detail in FIGS. 12, 13, 14, 15, 16 and 17. In these figures a number of conventional components are represented by symbolic blocks, as follows. Blocks marked with "A" are AND gates. In most cases these gates perform a logical AND of several individual lines onto a single output line. In some instances, however, one input to the AND gate is a bus. In these instances, each of the bits or lines in the bus is ANDed with each individual line which is also an input to the AND gate. Thus, in these instances, the output of the gate is a bus, rather than a single line, and the gate designated by an "A" is actually a set of AND gates.

Blocks marked with "OR" are conventional OR gates, performing a logical OR of several lines with an output on a single line. Gates marked with an "XOR" are exclusive OR gates. In some instances, these have more than two input lines, e.g., an eight bit bus. In these instances, the output appears on a single line and is active when an odd number of input bits are active, and is inactive when an even number of input bits are active.

Blocks marked with "N" are NOT gates or inverters. Blocks marked with "GL" are gated latches. These latches sample the active/inactive status of the input line entering the left edge of the block when the sample line entering the lower edge of the block is active. Between samplings a latch holds on its output line at the right edge of the block, the active/inactive status of the input line at the time it was last sampled.

Blocks marked with "T" and "R" are binary triggers. When the reset input line at the lower edge of the block adjacent the "R", is active, the output line is reset to inactive. The reset trigger will hold the inactive state at its output until it receives an active signal at the trigger input, at the left edge of the block adjacent the "T", at which time the output will become active. The output will remain active until a second active signal appears at the trigger input or until an active signal appears at the reset input, at which time the output becomes inactive again. Unless otherwise indicated, a trigger will change state at the leading edge of a trigger or reset signal. When the trigger changes state of the trailing edge of the signal, special note will be made.

Blocks marked "DECODE" accept a binary coded input on two or more lines and activate a single output line corresponding to the value of the binary coded input. Blocks marked "PAR GEN" accept a number of bits or lines as inputs and produce a single parity bit as output. The parity bit is active when the input contains an even number of active bits and inactive when the input contains an odd number of active bits.

Figure 12:
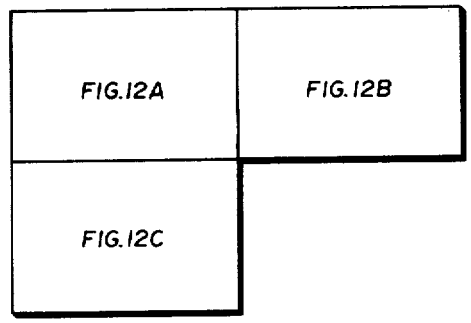
FIG. 12, including

FIG. 12 is a block schematic and flow diagram which shows the central portion of the sequencing logic which controls the progress of the channel 3 through the various sequences discussed above, including the Channel Error Sequence. The logical states which are the constitutents of these sequences are most readily observed in the two four-bit gated latches SEQ LT 100 and SEQ LTB 101 and in the two four-bit Decodes 102 and 103, each of which activates one of the output lines SS0-SS15 and ST0-ST15, respectively. The additional logic elements which are shown in FIG. 12 include AND gates 110-137, 241, OR gates 140-153 and 190-193, NOT gates 160-185, 296, and gated latches 104, 105 and 207.

Figure 13:
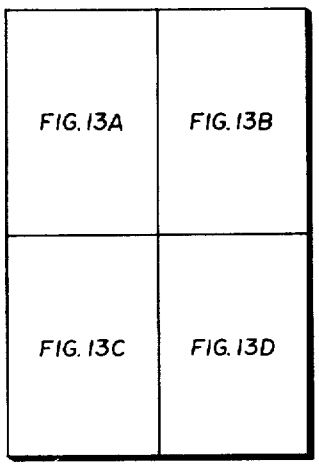
FIG. 13, including

FIG. 13 is a block schematic and flow diagram of the Priority Encode 52 in the channel 3. As seen in FIG. 13, the Priority Encode 52 comprises: a four-bit Decode 800; AND gates 801-816, 840-855 and 892 and 895; OR gates 871-889, 891 and 894; NOT gates 817-832, 856-870, 890 and 893; and gated latch 896.

Figure 14:
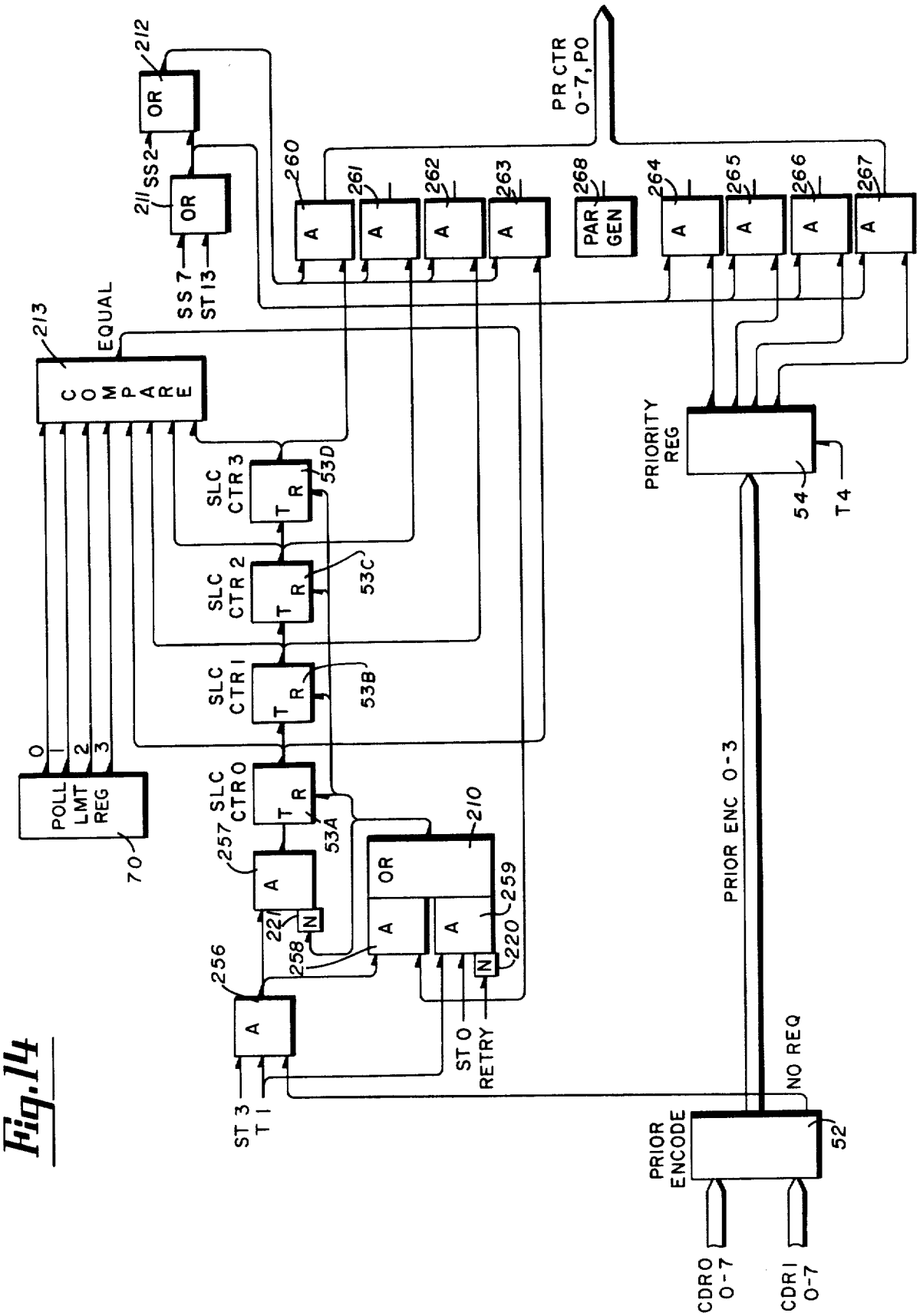
FIG. 14 is a detail block schematic and flow diagram of the polling and priority circuitry in the channel.

FIG. 14 is a block schematic and flow diagram of the polling and priority circuitry in the channel 3. As seen in FIG. 14, this circuitry comprises: the Priority Encode 52 of FIG. 13; the four-bit Poll Limit Register 70; the four-bit Priority Register 54; the four binary triggers 53A-53D also labeled SLC CTR0 to SLC CTR3, together forming the Slice Counter Register 53; AND gates 256-267; OR gates 210-212; NOT gates 220-221; the four-bit comparator 213; and the parity generator 268.

Figure 15B:
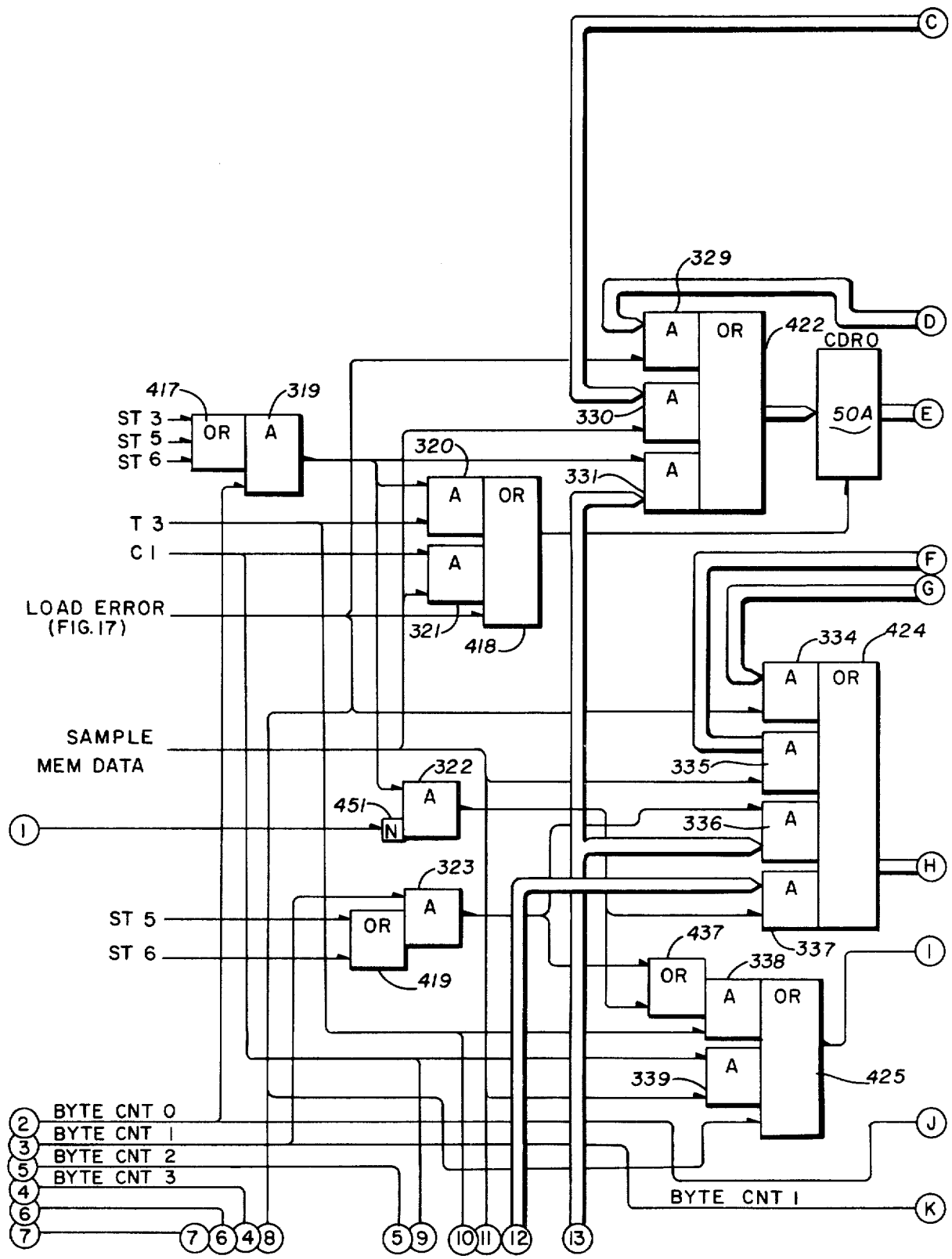
Figure 15C:
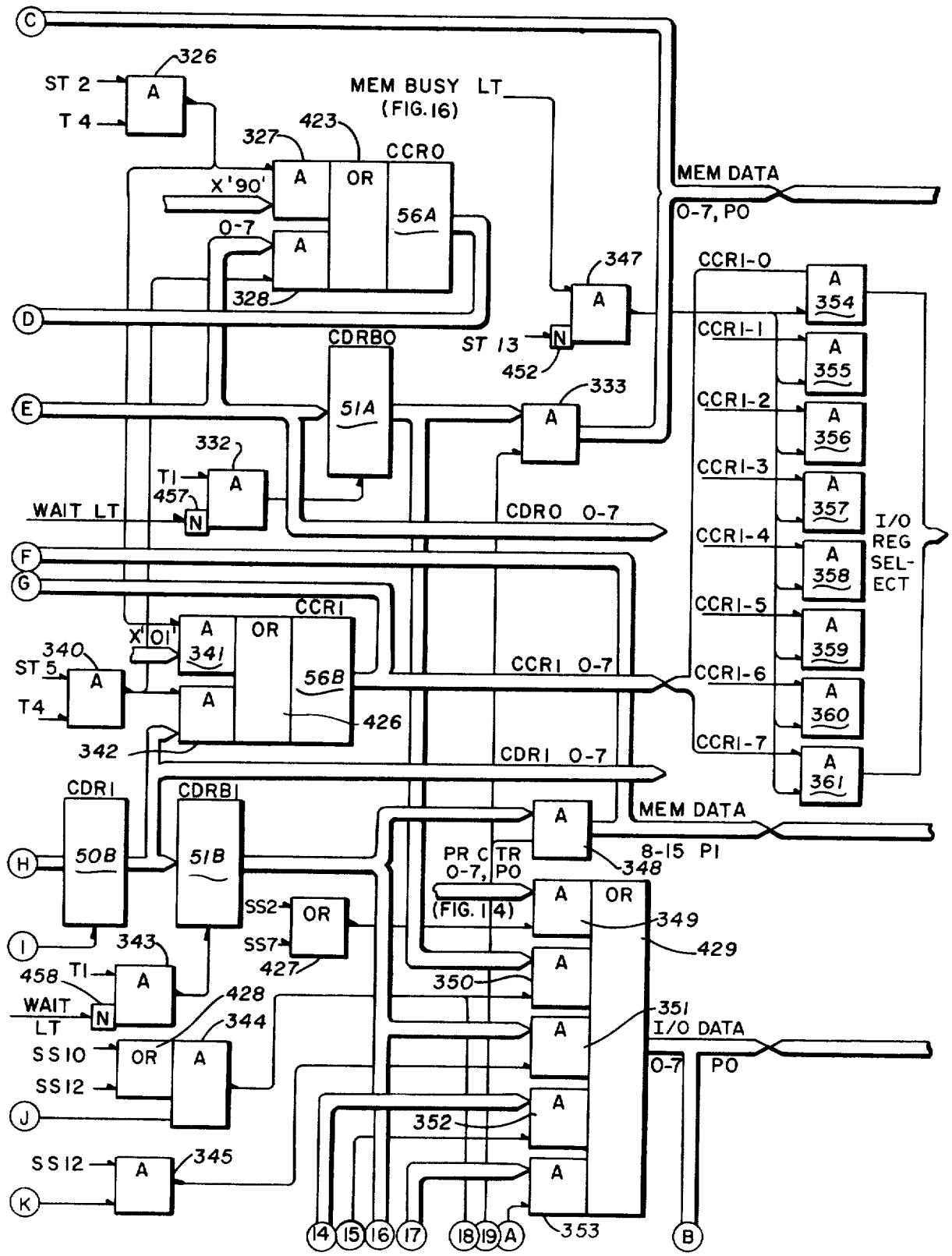
Figure 15E:
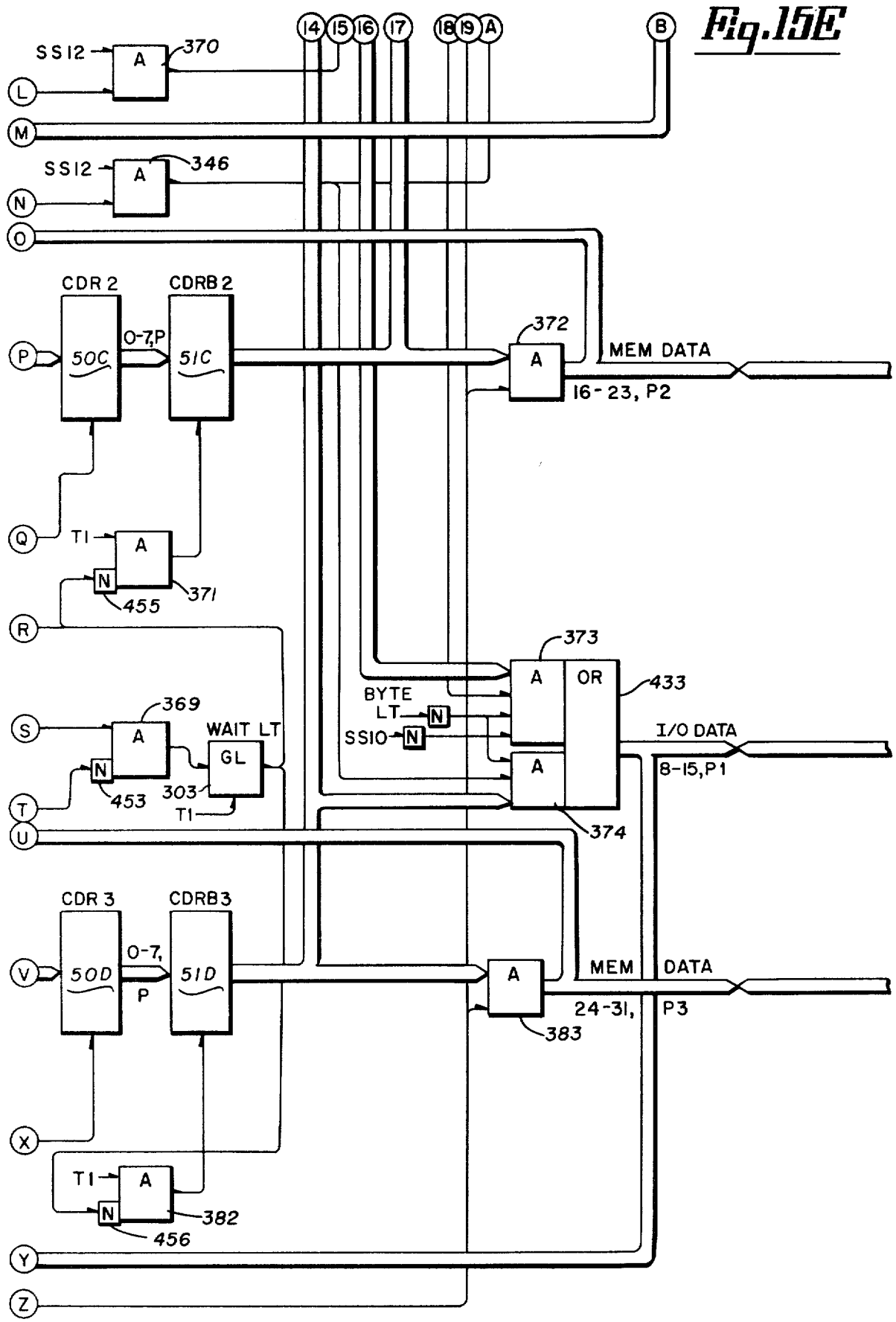
Figure 16B:
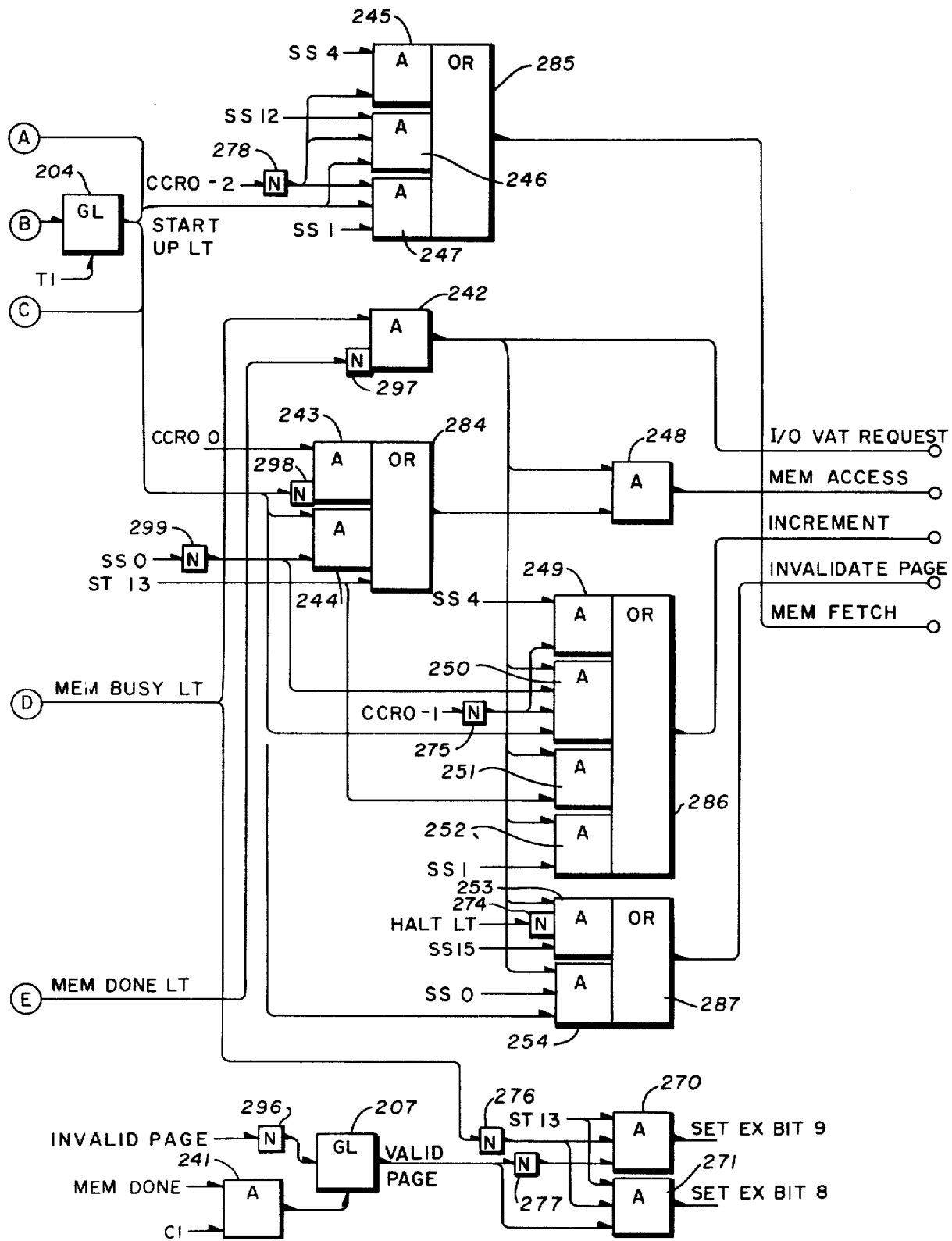
Figure 17A:
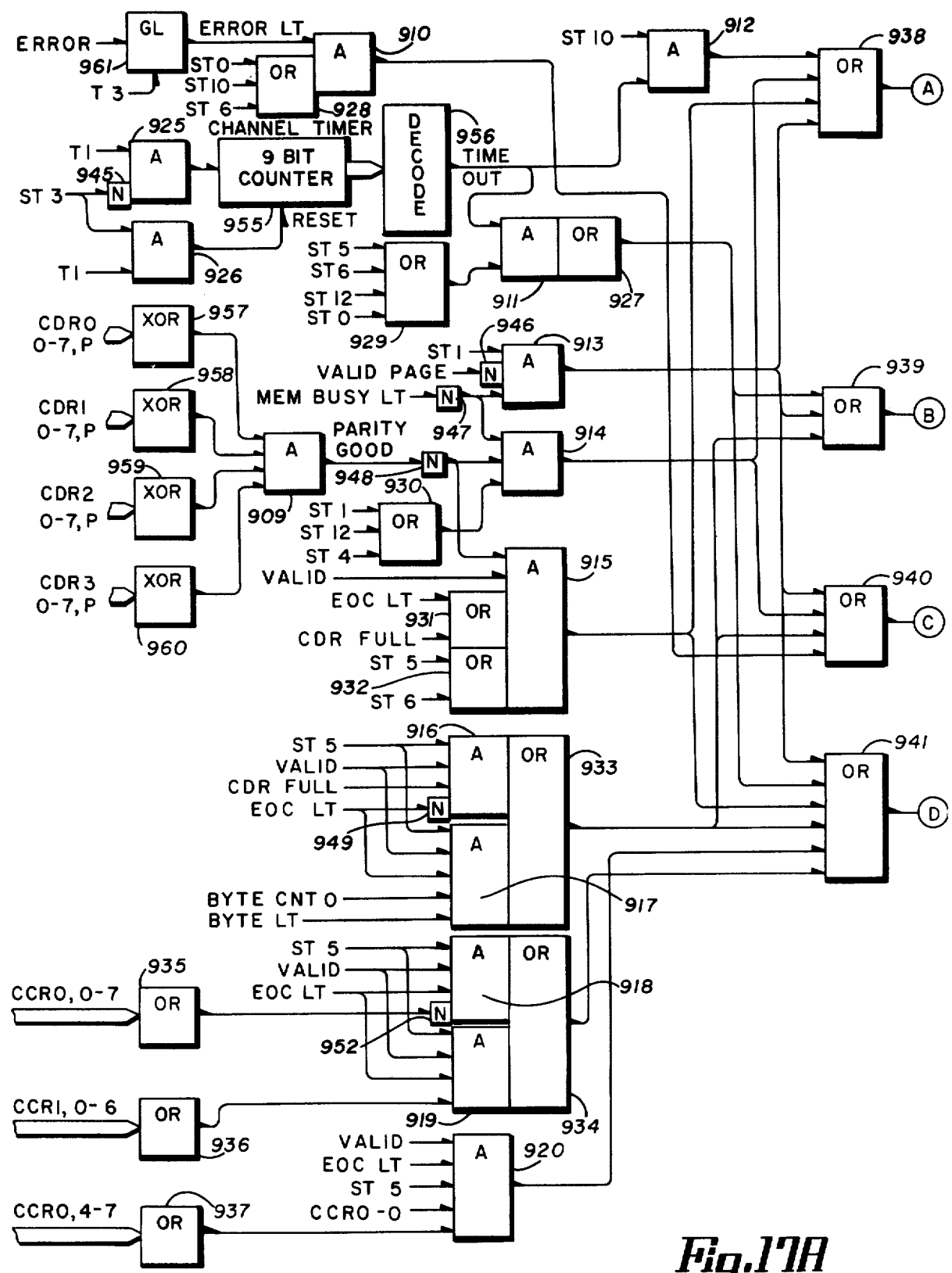
FIGS. 17A—17B, is a detail block schematic and flow diagram of the channel circuitry for controlling formation of a channel error event, showing lines and busses connected to the I/O adapter and the circuitry of FIGS. 12-16.
Figure 17B:
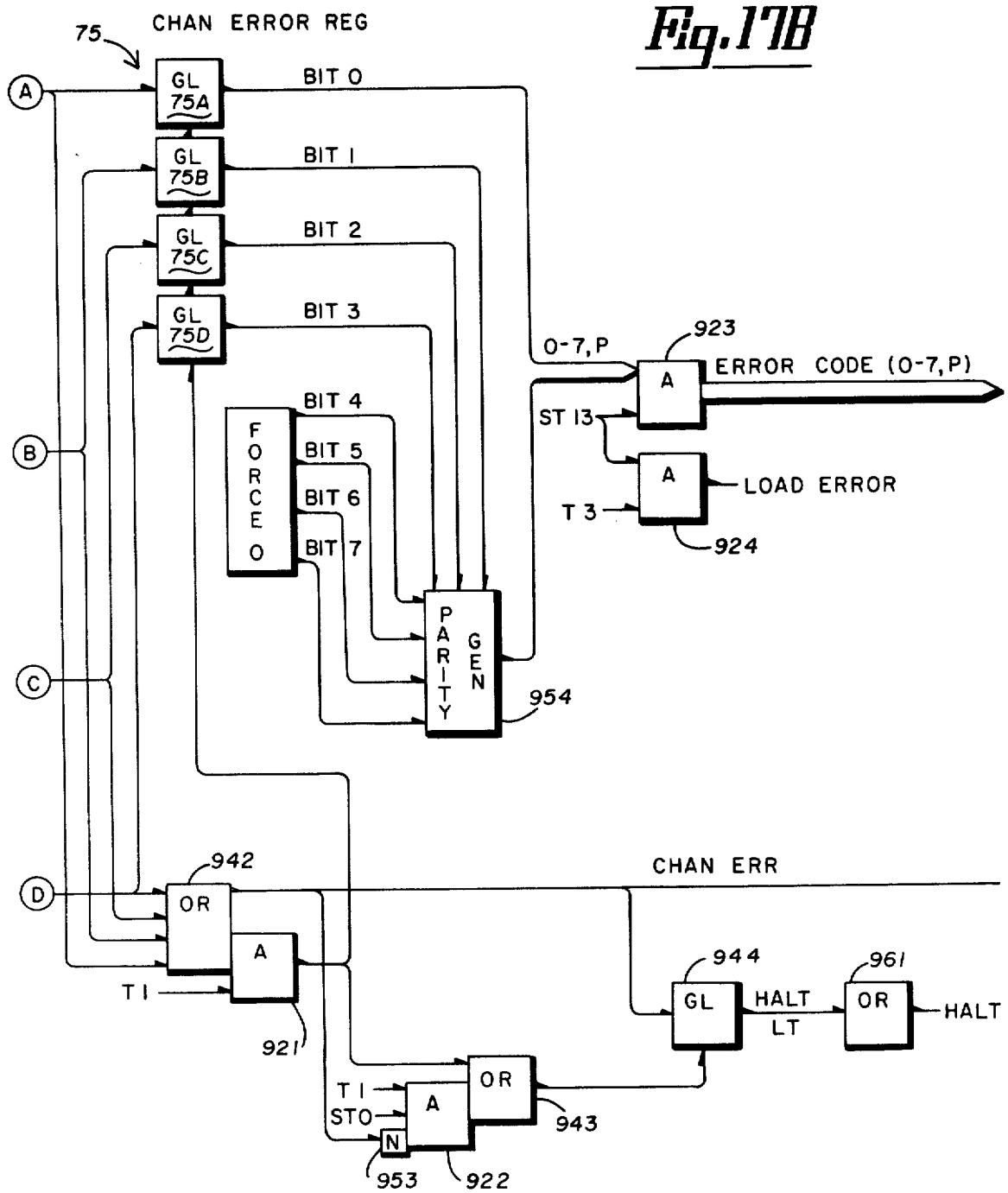

FIG. 15 is a block schematic and flow diagram of the various channel registers and their supporting circuitry. As seen in FIG. 15, this portion of the channel includes; four nine-bit (including parity), gated registers CDR0 to CDR3, 50A-50D, forming the CDR Register 50; four nine-bit (including parity), gated registers CDRB0 to CDRB3, 51A-51D, forming the CDRB Register 51; two eight-bit, gated registers CCR0 and CCR1, 56A, 56B, forming the two-byte CCR Register 56; trailing edge binary triggers 363, 364 labeled BYTE CTR0 and BYTE CTR1; gated latches 300-303; the two-bit Decode 304; AND gates 300-383; OR gates 410-436; and NOT gates 450-455.

Figure 16:
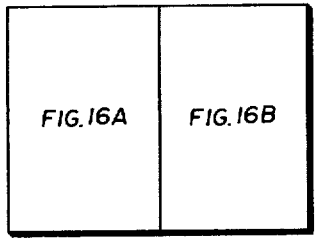
FIG. 16, including

FIG. 16 is a block schematic and flow diagram of the channel circuitry driving the control lines from the channel 3 to the VAT 2 and the CPU 1. As seen in FIG. 16, this circuitry includes: gated latches 200-207; AND gates 222-254 and 270-271; OR gates 279-287; and NOT gates 274-278 and 290-299.

Figure 17:
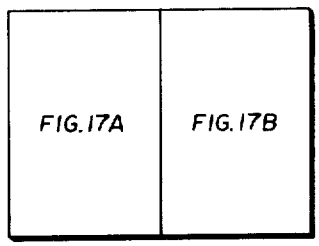
FIG. 17, including
Figure 1A:
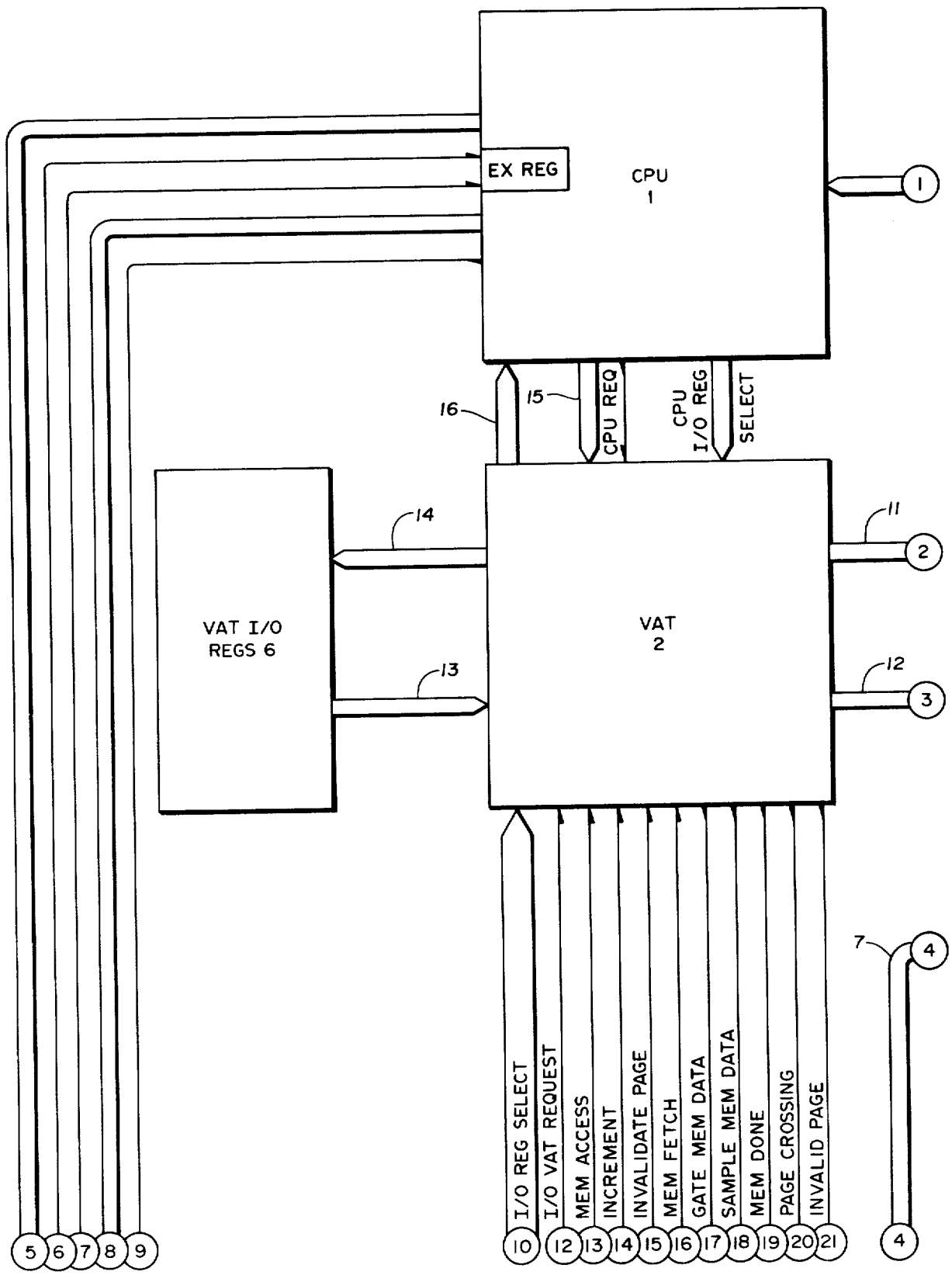
FIGS. 1A—1C, is a block schematic and flow diagram showing the computer system in which the invention is embodied.
Figure 1B:
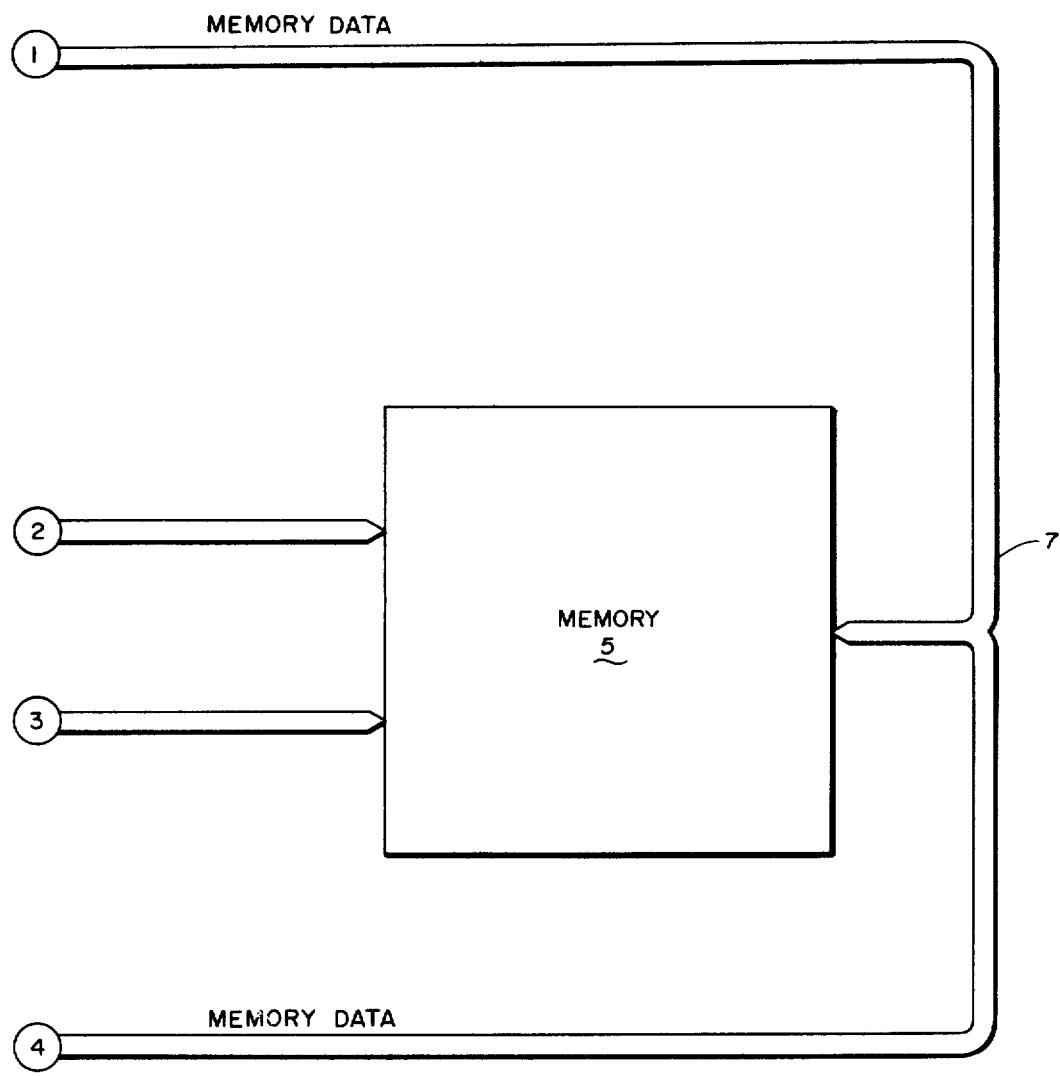
Figure 1C:
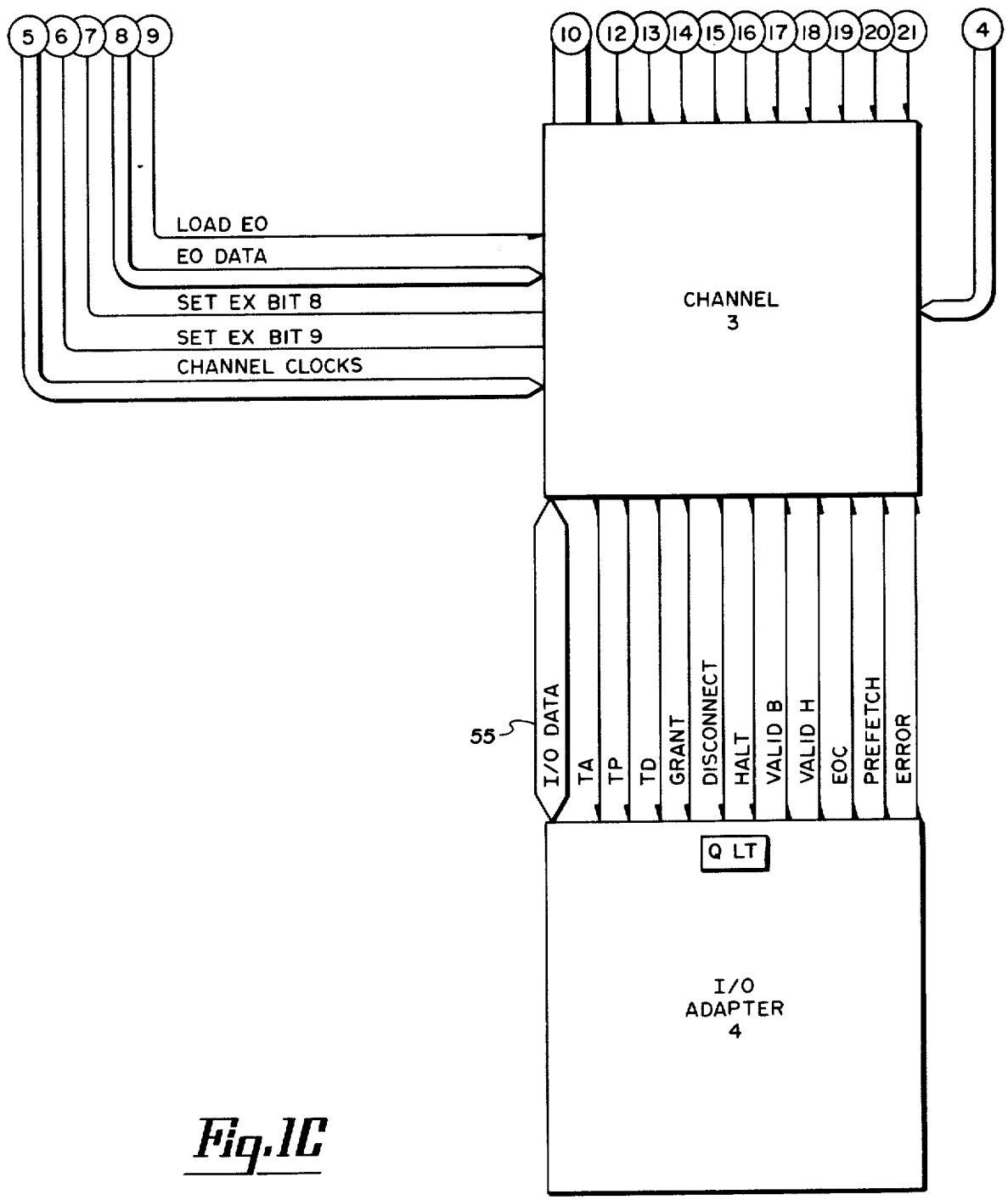
Figure 2A:
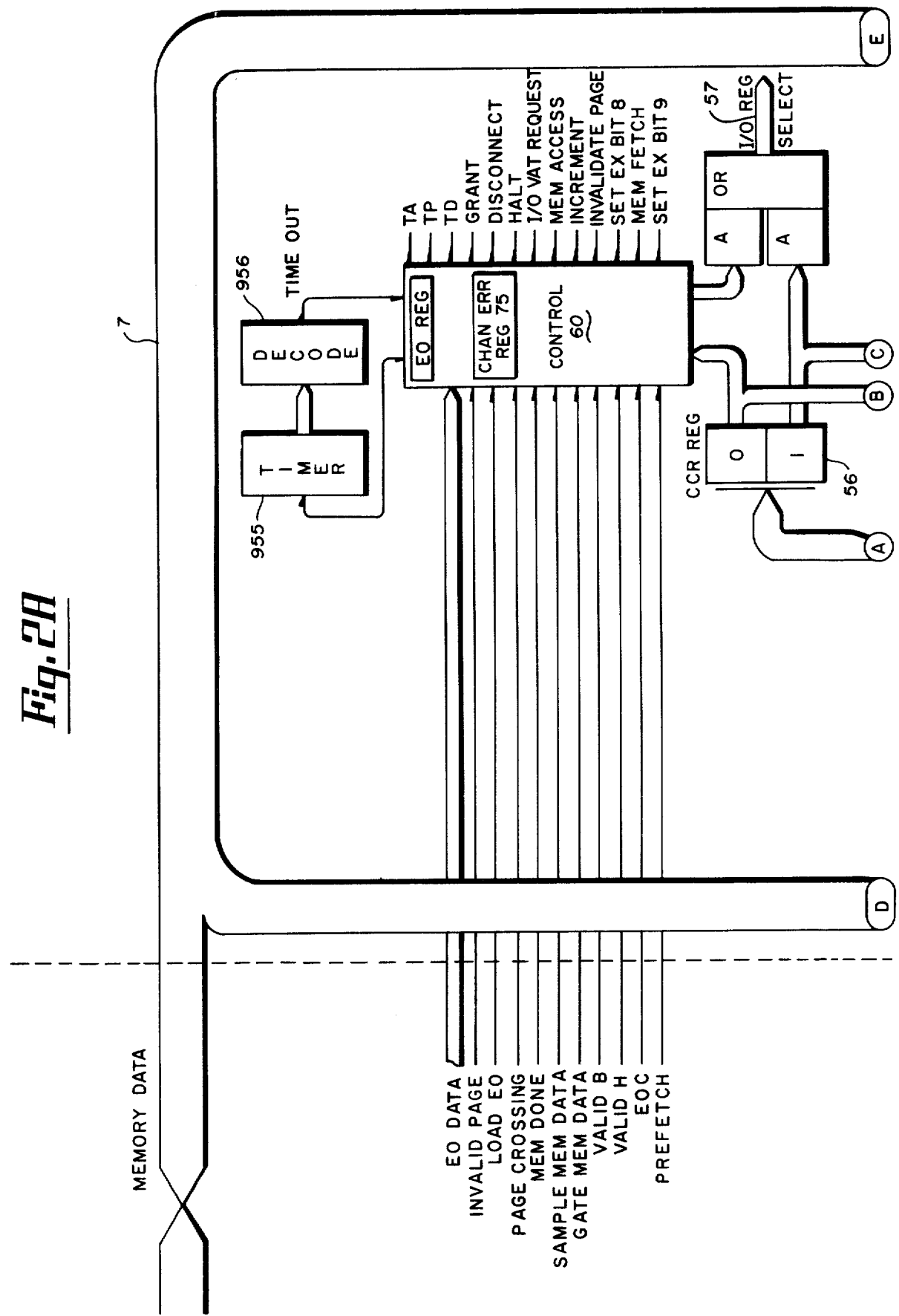

FIG. 17 is a block schematic and flow diagram of the channel circuitry for controlling formation of a channel error event. As seen in FIG. 17, this circuitry includes: a nine-bit Decode 956; a nine-bit Counter 955 serving as the channel timer; a parity generator 954; four commonly gated latches 75A-75D, together forming the Channel Error Register 75; gated latches 944 and 961; AND gates 909-926; OR gates 927-943 and 962; and NOT gates 945-953.

Figure 12A:
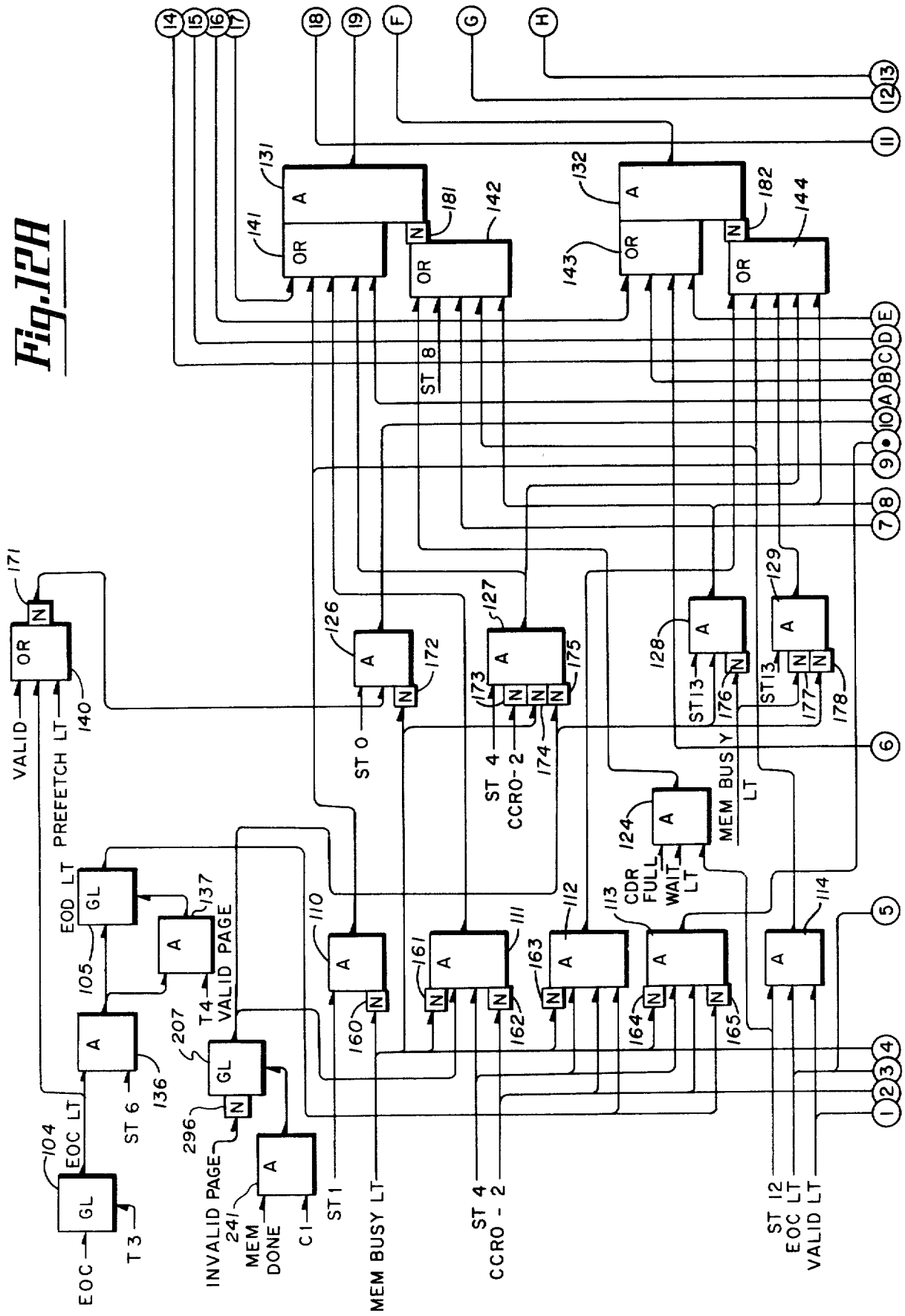
Figure 12B:
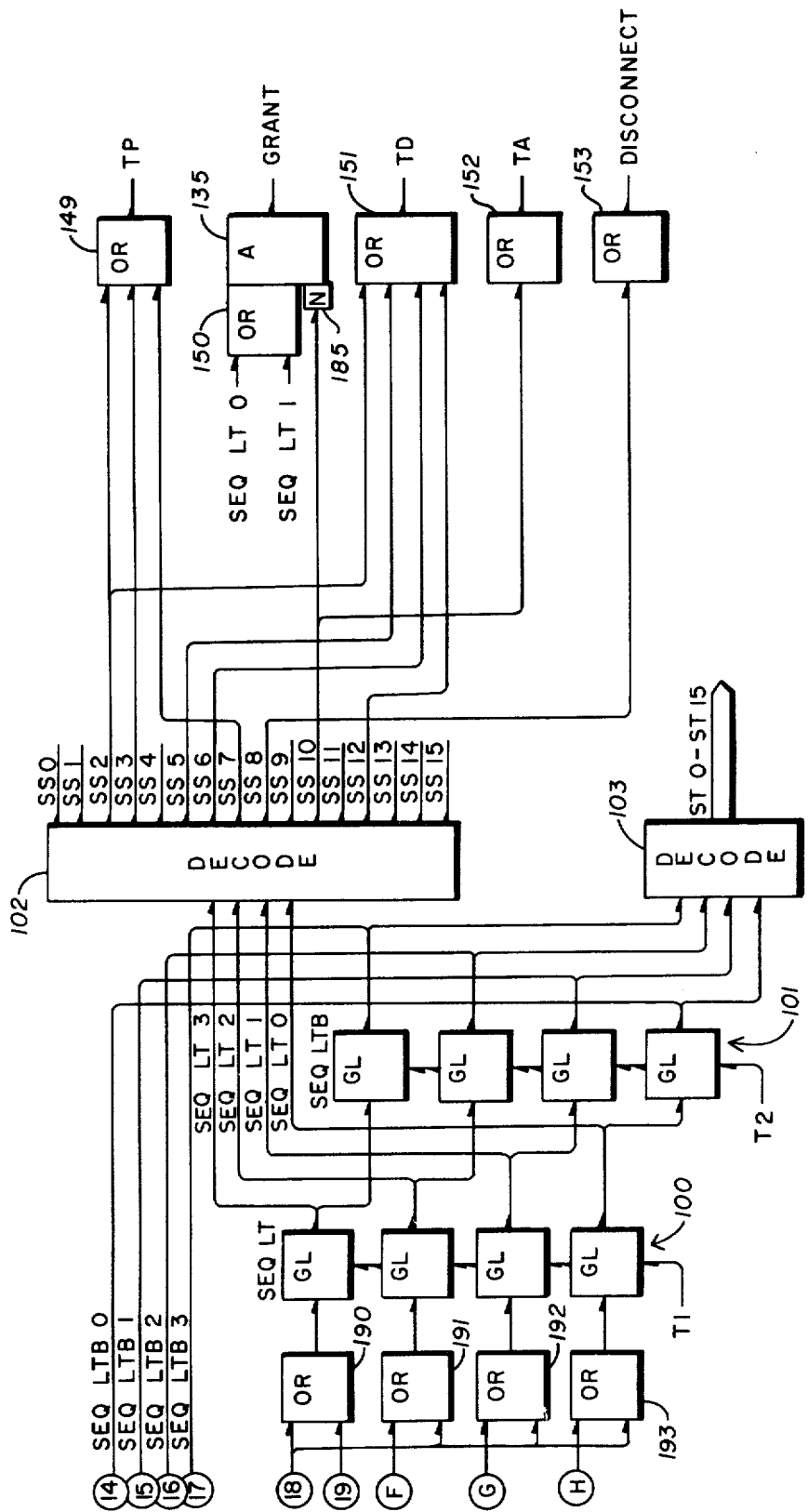
Figure 13A:
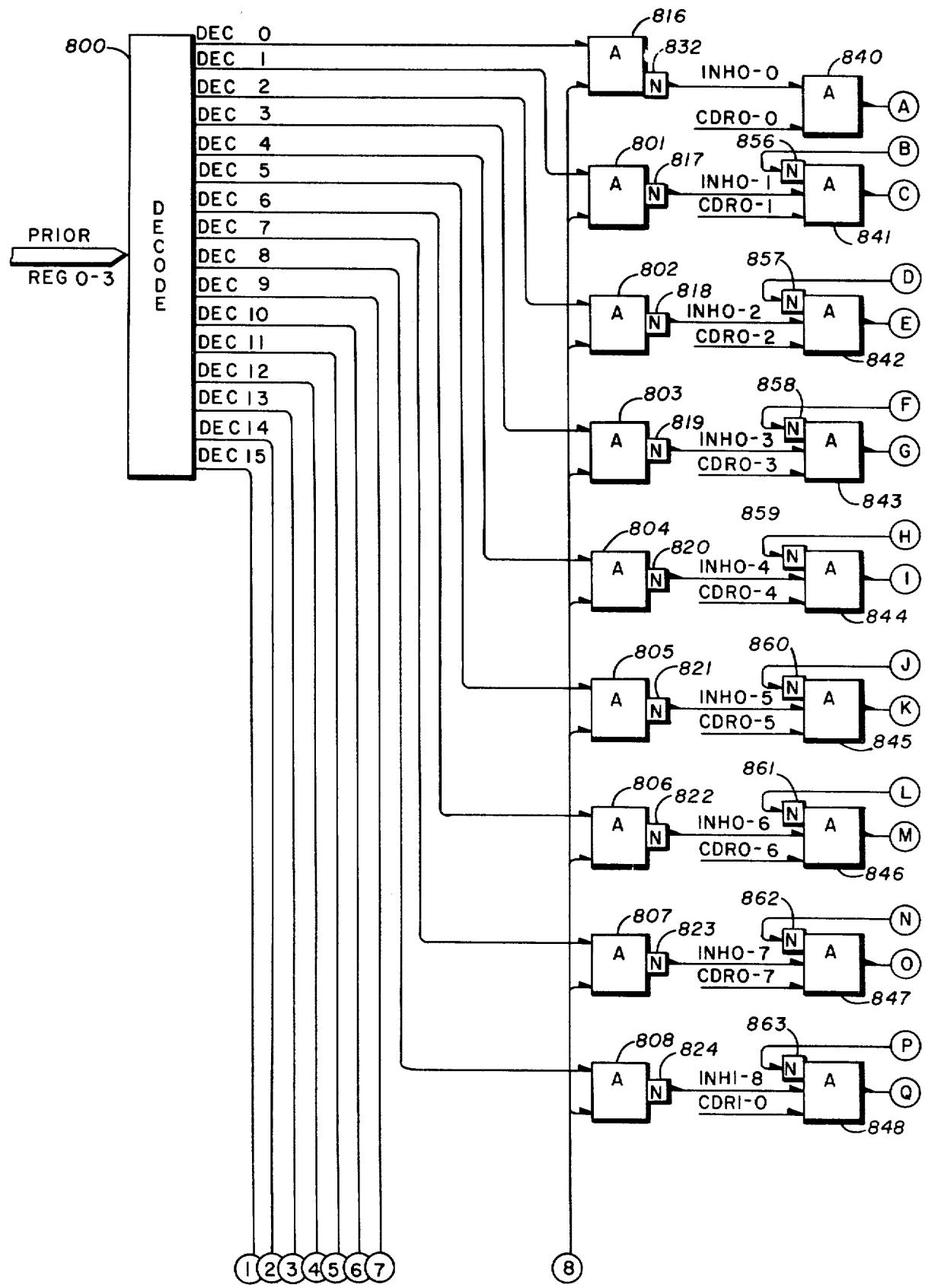
FIGS. 13A—13D, is a detail block schematic and flow diagram of the Priority Encode in the channel, identified by reference number 52 in FIG. 2.
Figure 13B:
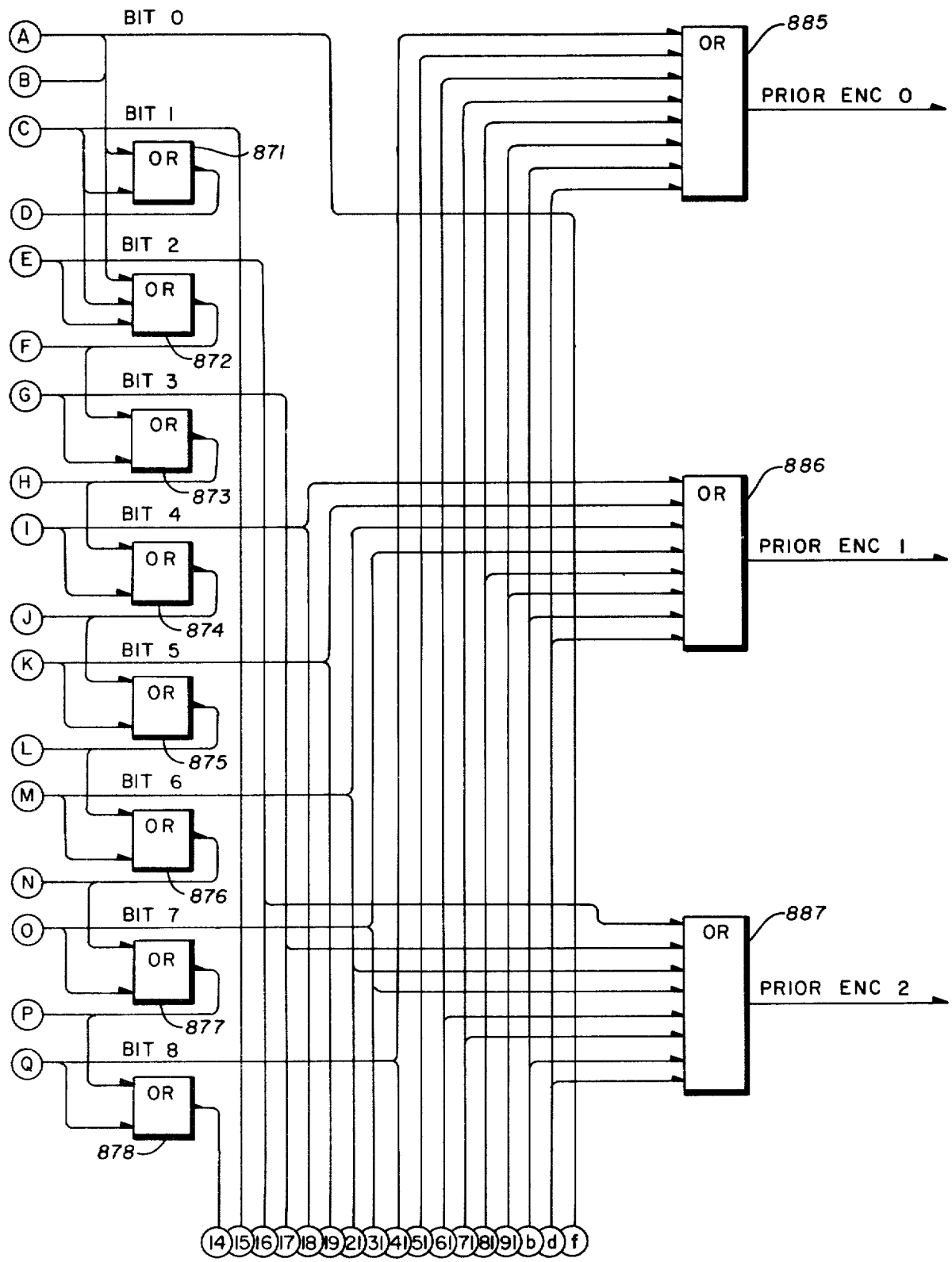
Figure 13C:
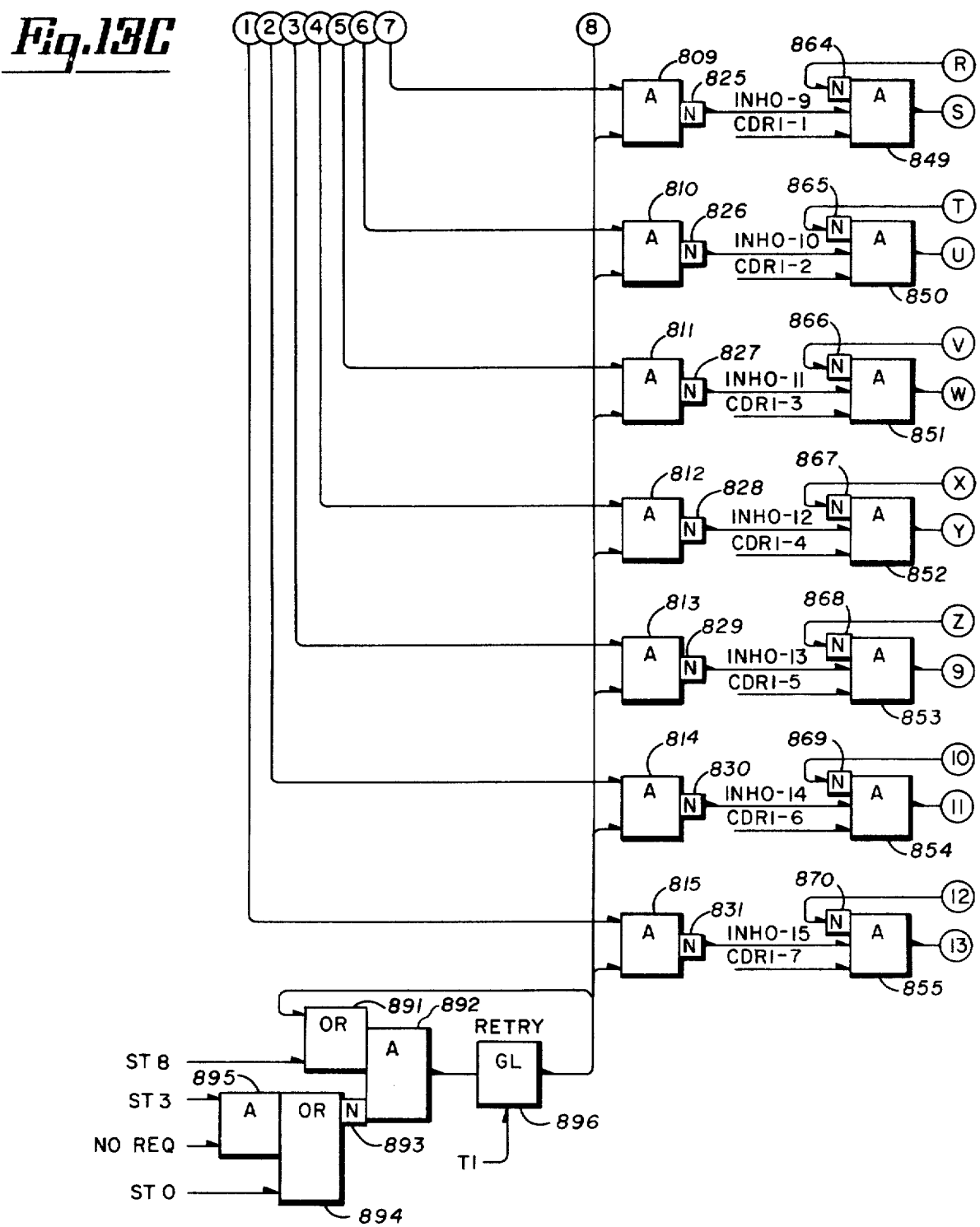
Figure 13D:
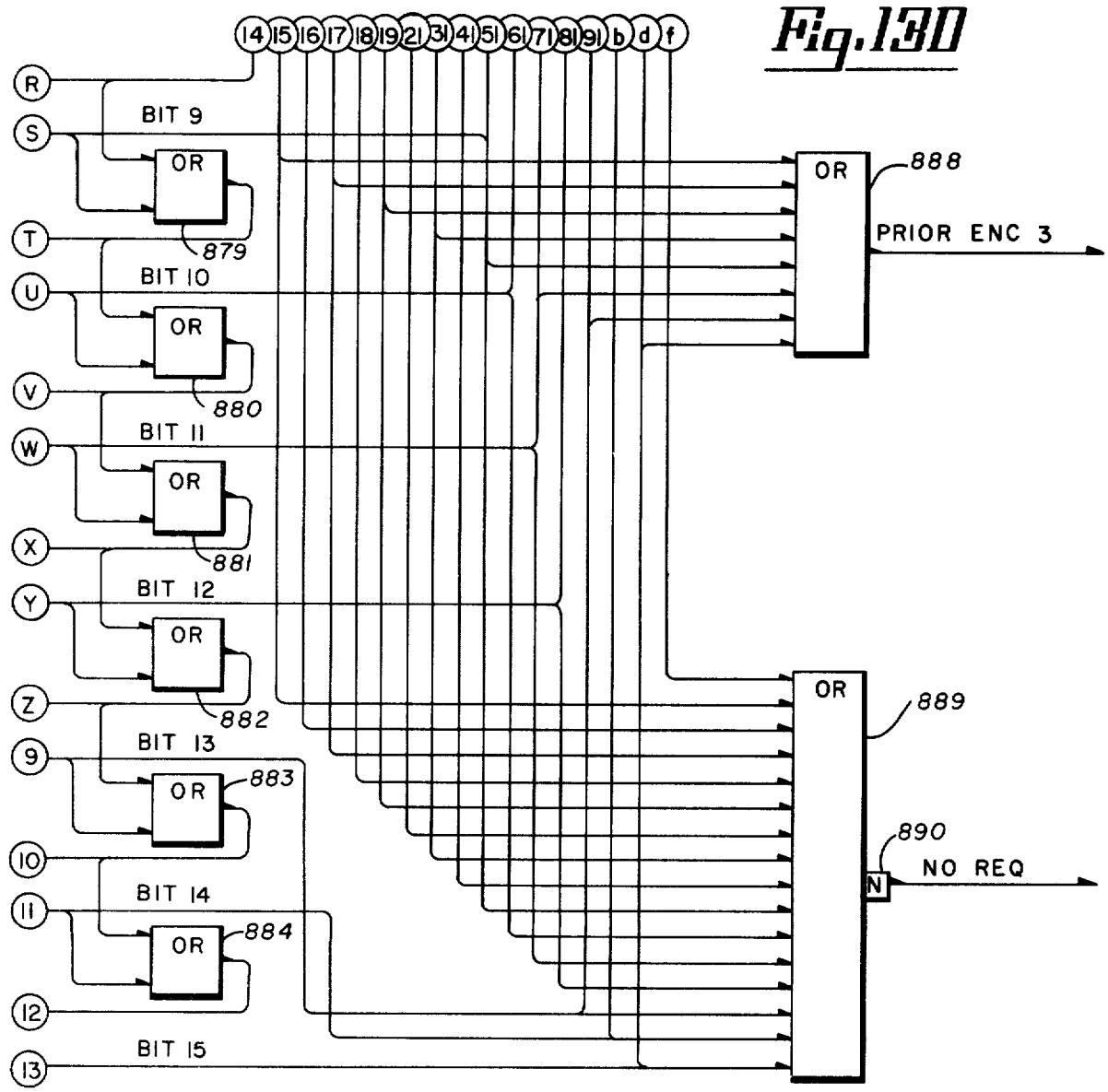

Referring now to FIG. 12, it is seen that the four SEQ LT latches 100 are loaded with the active or inactive states prevailing on the output lines of OR gates 190-193 when the T1 clock pulse appears at their parallel-connected sample inputs. Similarly, the four SEQ LTB latches 101 are loaded with the active or inactive states prevailing on the output lines of the SEQ LT latches 100 when the T2 clock pulse appears at their parallel-connected sample inputs. Each of the SEQ LT and SEQ LTB latches 100, 101 may be viewed as a four-bit register. In this discussion the uppermost of each of the sets of four latches (as viewed in FIG. 12B) is referred to as representing the third order ($2^3$) bit. The next to the uppermost latch represents the second order ($2^2$) bit, and so forth, in descending order through the first and zeroth order bits. Accordingly, when the SEQ LT and SEQ LTB latches 100, 101 are loaded with a value of eleven, each set of latches has it third, first and zeroth order bits active, while the second order bits are inactive. When the latches are loaded with a value of two, only the first order latches are active. It should also be noted that the SEQ ITB 0-3 lines feed back into AND gates 141, 143, 145 and 147 such that the SEQ LT latches 100 are reloaded with their previous value (held in the SEQ LTB latches 101) unless degating occurs in one of the NOT gates 181-184.

Referring now to FIG. 17, it is seen that the channel 3 includes various means for indicating the occurrence and type of channel errors. For detecting certain types of errors having to do with the timing of channel interface operations a channel timer 955 is employed. The channel timer 955 consists of a nine-bit counter, which is incremented every 400 nanoseconds in accordance with the clock pulse T1. The count is incremented by means of AND gate 925 and NOT gate 945. The count is reset during the Channel Poll Sequence by means of AND gate 926. Normally the count is reset before it reaches the maximum value of 511. If the count is not reset, for example, due to a hung condition by the I/O adapter 4, the TIME OUT line becomes active via DECODE 956, which decodes the maximum counter value of 511 into the single TIME OUT line.

The TIME OUT line can become active at any stage of the execution of the various sequences described above. The progress of the channel 3 and I/O adapter 4 through these sequences is controlled by the logic shown in FIGS. 12-16. As best seen in FIG. 12, the primary control logic governing the sequences includes two groups of sequencing latches SEQ LT 100 and SEQ LTB 101, with two associated Decodes 102 and 103. The Decodes 102 and 103 take the four bit outputs of SEQ LT latch 100 and SEQ LTB latch 101, respectively, and decode them onto lines SS0-SS15 and ST0-ST15. Only a single line is active from each of the decodes 102 and 103 at one time. Accordingly, the active lines may be regarded as representing the states of the sequencing logic and the channel control as a whole. In this regard, it should be noted that SEQ LT latches 100 are loaded and can only change state at a T1 clock pulse. SEQ LTB latches 101 are always loaded with the contents of SEQ LT latches 100 at the next following clock pulse. Accordingly, at clock pulse T2 the SEQ LTB latches 101 always have the same content as the SEQ LT latches 100 and the correspondingly numbered output lines from the Decodes 102 and 103 will both be active. For example, at any given T2 clock pulse, if the SS2 line is active the ST2 line is also active.

As best seen in FIG. 17, the state of the channel sequencing logic of FIG. 12 is communicated to the channel error logic by several output lines from the Decode 103, including, at various gates, ST0, ST1, ST3, ST4, ST5, ST6, ST10 and ST12. The activation of these lines corresponds to the following states in the execution of various control sequences:

ST0—The channel 3 is waiting for control lines to be deactivated by an I/O adapter 4.

ST1—The channel 3 is fetching an I/O device/adapter address from memory as part of the Start Device Sequence.

ST3—The channel 3 is looking for service requests from the I/O adapters, as indicated by priority bits sent to the channel 3.

ST4—The channel 3 is waiting for the memory 5 to signal completion of a fetch or store operation requested by the channel 3.

ST5—The channel 3 is accepting a CCF gated to it on the I/O DATA bus by an I/O adapter 4.

ST6—An I/O adapter 4 is transferring data brought from an I/O device to the channel 3.

ST10—The channel 3 is sending out an I/O device/adapter address on the I/O DATA bus.

ST12—The channel 3 is transferring either data or an immediate command fetched from memory 5 to an I/O adapter 4.

For an explanation of the manner in which the sequencing logic shown in FIGS. 12-16 moves from state to state and activates the lines ST0, ST1, ST3-ST6, ST10 and ST12, reference can be made to two commonly-assigned, copending applications, "Virtual Addressing for I/O Adapters," filed Oct. 3, 1978, Ser. No. 953,659 issued as Pat. No. 4,228,504, and "Command Queuing for I/O Adapters," filed Oct. 23, 1978, Ser. No. 954,070, issued as U.S. Pat. No. 4,224,667.

If the TIME OUT line becomes active while the channel 3 is accepting a CCF (ST5 active), waiting for completion of the data transfer to or from an I/O adapter 4 (ST6 or ST12 active), or waiting for an I/O adapter 4 to deactivate the VALID, EOC or PREFETCH lines (ST0 active), then a value of five is loaded into the Channel Error Register 75 at a T1 clock pulse by means of AND gates 911 and 921 and OR gates 929, 927, 939, 941 and 942. The value five in the Channel Error Register 75 thus indicates occurrence of one type of timing sequence error. Note that the latch with output line BIT 0 in the Channel Error Register 75 is considered to have the high order ($2^3$) bit, while the latch with output line BIT 3 has the low order ($2^0$) bit.

If the TIME OUT line becomes active when the channel 3 sends out an I/O device/adapter address during the Start Device Sequence (ST10 active), then a value of eight is loaded into the Channel Error Register 75 by means of AND gates 912 and 921 and OR gates 938 and 942. The value eight in the Channel Error Register 75 thus indicates occurrence of a second type of timing sequence error.

Parity errors may be detected either in the channel 3 or the I/O adapter 4. The I/O adapter 4 activates the ERROR line to the channel 3 to indicate that bad parity has been found on the I/O DATA bus from the channel 3. The ERROR line becoming active causes the ERROR LT latch 961 to be set at the next T3 clock pulse. The ERROR LT latch 961 being set causes a value of two to be loaded into the Channel Error Register 75 by means of AND gates 910 and 921 and OR gates 928, 940 and 942. The ERROR LT latch is sampled when the channel 3 is waiting for control lines to be deactivated (ST0 active), when the channel 3 sends out an I/O adapter address during the Start Device Sequence (ST10 active) and during a data transfer from the adapter 4 (ST6 active). Accordingly, the value two in the Channel Error Register 75 indicates occurrence of a parity error detected by the I/O adapter 4.

When data from the I/O adapter 4 is loaded into the CDR0-CDR3 Registers 50A-50B by means of the I/O DATA bus or when the data is loaded into the CDR0-CDR3 Registers 50A-50B from the memory 5 by means of the MEMORY DATA bus 7, the parity of the data is checked by means of XOR gates 957-960 and AND gate 909. If bad parity found in any of the CDR0-CDR3 Registers 50A-50D, the PARITY GOOD line becomes inactive. If the PARITY GOOD line becomes inactive following the fetch of the I/O device adapter address during the Start Device Sequence (ST1 active), or during a fetch of data from memory 5 during a transfer of data to an I/O adapter 4 (ST4 or ST12 active), then a value of ten is loaded into the Channel Error Register 75 by means of AND gates 914 and 921, OR gates 930, 938, 940 and 942 and NOT gates 948 and 947. (The MEM BUSY LT latch 205 (FIG. 16) will become inactive at the end of each fetch). If the PARITY GOOD line becomes inactive during the transfer of the CCF (ST5 active) or during the transfer of data from the I/O adapter 4 to the channel 3 (ST6 active), then a value of nine is loaded into the Channel Error Register 75 by means of AND gates 915 and 921, OR gates 931, 932, 938, 941 and 942 and NOT gate 948. (The VALID 207 (FIG. 16) and EOC LT 104 (FIG. 12) latches are activated when transfer of a CCF or data is completed.) Accordingly, the occurrence of parity errors detected by the channel 3 is indicated by values of ten or nine in the Channel Error Register 75.

If the VALID PAGE latch 207 (FIG. 16) is not set when the I/O device/adapter address is fetched during a Start Device Sequence (ST1 active), then a value of fifteen is loaded into the Channel Error Register 75 by means of AND gates 913 and 921, OR gates 938, 939, 940, 941 and 942 and NOT gates 946 and 947. (The MEM BUSY LT latch 205 (FIG. 16) will be deactivated when the memory 5 completes the fetch.) The value of fifteen loaded into the Channel Error Register 75 indicates the occurrence of this type of sequence error.

If the channel 3 detects an improper number of bytes transferred during a CCF transfer (ST5 active), a value of seven is loaded into the Channel Error Register 75 by means of AND gates 921 and 916 or 917, OR gates 933, 939, 940, 941 and 942 and NOT gate 949. The AND gate 916 detects an error when the CDR FULL line is active, indicating that four bytes have been sent by the I/O adapter 4 without the EOC line and EOC LT latch 104 (FIG. 12) being activated. The AND gate 917 detects an error when the EOC LT latch 104 is active, indicating the end of the CCF, but the BYTE CNT 0 line is also active, indicating that only one byte has been sent. The BYTE LT line ensures that this error is checked for only when the I/O adapter 4 is a byte, not a halfword, adapter. Accordingly, a value of seven in the Channel Error Register 75 indicates the occurrence of this type of sequence error.

Command errors involving unrecognized CCF formats transferred to the CCR Register 56 (ST5 active) are also detected by the logic shown in FIG. 17. If the channel 3 detects an invalid CCF, then a value of one will be loaded into the Channel Error Register 75. An invalid CCF will be detected, for example, when bits 0-7 of the first byte of the CCF (CCR0, bits 0-7) contain all 0's or when bit 0 of the first byte of the CCF is a 1 and bits 4 to 7 are not 0. An invalid CCF is also registered when the Start Device Register or the Event Stack Register is specified by the I/O adapter 4 in the second byte of the CCF. (FIG. 4 shows that the Start Device Register is specified when bits CCR1 0-6 are 0 and bit CCR1 7 is 1, while the Event Stack Register is specified when bits CCR1 0-7 are all 0. Neither of these registers should be specified by an I/O adapter 4; only the channel 3 may specify them.) The value of one is loaded into the Channel Error Register 75 by means of AND gates 918, 919 or 920, and 921; OR gates 935, 936, or 937, and 934, 941 and 942; and NOT gate 952. Accordingly, a one in the Channel Error Register 75 indicates the occurrence of a command error.

When any of the above-described means for indicating the occurrence and type of channel errors are activated, the CHAN ERR line from OR gate 942 becomes active, causing the HALT LT latch 944 to be set by means of OR gate 943. The HALT LT latch being set causes the HALT line to the I/O adapter 4 to become active by means of OR gate 961. This line becoming active informs the I/O adapter 4 that an error condition has been detected and serves to halt all further processing of the current command by the I/O adapter 4.

Referring now to FIG. 12, the CHAN ERR line being active also causes a value of fifteen to be placed into the SEQ LT latches 100, by means of OR gates 190-193 at a T1 clock pulse. At the next T2 clock pulse the fifteen in the SEQ LT latches 100 is loaded into the SEQ LTB latches 101, causing the ST15 line from Decode 103 to become active. At the next T1 clock pulse, a value of thirteen is loaded into the SEQ LT latches 100 by deactivating the first order bit by means of OR gate 146, NOT gate 183 and AND gate 133. At the next T2 clock pulse, the SEQ LTB latches 101 are loaded with the contents of SEQ LT latches 100, causing the ST13 line from Decode 103 to become active. The ST13 line being active at the next T3 clock pulse causes the LOAD ERROR line to become active by means of AND gate 924 (FIG. 17), causing the CCR0 and CCR1 Registers 56A, 56B, containing the I/O adapters CCF to be gated into the CDR0 and CDR1 Registers 50A, 50B, (channel function field and first identification field, bytes 0 and 1 of the channel error event) by means of AND gate 329 and 334 and OR gates 422, 424, 418 and 425 (FIG. 15). The LOAD ERROR and ST13 lines being active also causes the time slice and priority of the I/O adapter 4 connected to the channel 3 to be gated via the PR CTR bus bits 0-7, P0 to the CDR2 Register 50C (second identification field, byte 2 of the channel error event) by means of OR gates 211, 212, (FIG. 14) 430 and 431 (FIG. 15), AND gates 362 (FIG. 15) 260 through 267 and 363, and parity generator 268 (FIG. 14). Finally, the LOAD ERROR line being active also causes the error code in the Channel Error Register 75 (FIG. 17) to be loaded into the CDR3 Register 50D (third identification field, byte 3 of the channel error event) by means of AND gate 923 (FIG. 17) and OR gates 434 and 435, via the ERROR CODE bus, bits 0-7.

At the next T1 clock pulse, the data in the CDR0-CDR3 Registers 50A-50D is loaded into the CDRB0-CDRB3 registers 51A-51D by means of AND gates 332, 343, 371, and 382 and NOT gates 455-458. At this point, the means responsive to the occurrence of the channel error have completed formation of a channel error event, which is now ready to be sent to the CPU. Accordingly, the means for storing the formed channel error event on the I/O Event Stack, begin their activity. Also at T1 clock time, the MEM BUSY LT latch 205 (FIG. 16) is set by means of OR gates 281 (ST13 is active) and 282, NOT gate 294 and AND gates 236 and 237. The MEM BUSY LT latch being set causes the I/O VAT REQUEST, MEM ACCESS and INCREMENT lines to become active to the VAT 2 by means of AND gates 242, 248 and 251, OR gates 284, 286 and NOT gate 297. A value of 0 (specifying the Event Stack Register) is gated over the I/O REG SELECT bus 57 to the VAT 2, because ST13 is active, inhibiting the AND gate 347, which, in turn, inhibits all the AND gates 354-361 which feed the I/O REG SELECT bus 57 (FIG. 15).

The I/O VAT REQUEST line becoming active to the VAT 2 causes the VAT control 402 to select the Event Stack Register and load the address pointer to the top of the I/O Event Stack into the VAT Register 401. The GATE MEM DATA line from the VAT control 402 becomes active, causing the data in the CDRB0-CDRB3 Registers 51A-51D to be gated to the MEMORY DATA bus 7 by means of AND gates 333, 348, 372, and 383. Referring now to FIG. 3, the VAT 2 then gates the address of the I/O Event Stack from the VAT Register 401 to the memory on the MEMORY ADDRESS bus, via AND gate 92, conditioned by the MEM ACCESS and GATE MEM ADDR lines, and makes the MEMORY STORE line active. The VAT control 402 then updates the I/O Event Stack address pointer by incrementing the address in the VAT Register 401 by four and stores the address back into the Event Stack Register. Referring now to FIG. 16, when the memory store is complete, the MEM DONE line from the memory 5 becomes active, causing the MEM DONE LT latch 206 to be set at the next C1 clock pulse, by means of AND gate 239 and OR gate 283. The VALID PAGE latch 207 is also set at this time if the INVALID PAGE line from the VAT 2 is inactive, via NOT gate 296 and AND gate 241. At the next T4 clock pulse, the MEM BUSY LT latch is reset by means of AND gates 238 and 236, OR gate 282 and NOT gate 294. The MEM BUSY LT latch being reset causes the I/O VAT REQUEST, MEM ACCESS and INCREMENT lines to the VAT 2 to become inactive.

At the next T1 clock pulse, if the VALID PAGE latch 207 is set, then a value of zero is loaded into the SEQ LT latches 100 by deactivating the active latches, by means of AND gates 128, 131, 132 and 134, NOT gates 176, 181, 182 and 184 and OR gates 142, 144, 148, 190, 191 and 193 (FIG. 12). If the VALID PAGE latch 207 is set, then the SET EX BIT 8 line to the CPU 1 will become active by means of AND gate 271 and NOT gate 276, also at time T1 (FIG. 16). The SET EX BIT 8 line being active causes bit 8 in the EX Register in the CPU 1 to be set, indicating that an event has been stored on the I/O Event Stack. At the next T2 clock pulse, the data in the SEQ LT latches 100 is gated into the SEQ LTB latches 101, causing the ST0 line for Decode 103 to become active. At the next T1 clock pulse, ST0 being active causes a value of two to be loaded into the SEQ LT latches 100, thus returning the channel 3 to a normal Poll Sequence (FIG. 12).

If the VALID PAGE latch 207 was not set when the channel 3 attempted to store the channel error event on the I/O Event Stack, then a value of nine is loaded into the SEQ LT latches 100 by deactivating the second order bit in the SEQ LT latches 100, by means of AND gates 129 and 132, OR gate 144 and NOT gates 177, 178 and 182 (FIG. 12). The VALID PAGE latch 207 not being set also causes the SET EX BIT 9 line to the CPU 1 to become active by means of AND gate 270 and NOT gates 276 and 277 (FIG. 16). The SET EX BIT 9 line becoming active causes bit 9 in the EX Register in the CPU 1 to be set, indicating that the channel 3 has encountered an error which is not recoverable.

Referring again to FIG. 12, at the next T2 clock pulse, the SEQ LT latches 100 are loaded into the SEQ LTB latches 101, causing the ST9 line to become active, by means of Decode 103. The SEQ LT and SEQ LTB latches 100, 101 will contain a value of nine until the CPU 1 resets bit 0 on the EO DATA bus and corrects the address in the Event Stack Register. When the CPU 1 loads a value of binary '000' into the EO-0 to EO-2 latches via the EO DATA bus, a value of fifteen is loaded into the SEQ LT latches 100 by means of AND gates 130, 132 and 133, OR gates 143, 145, 191 and 192 and NOT gate 180. The channel hardware again attempts to store the channel error event as described previously, beginning at the point where the CHAN ERR line being active causes a value of fifteen to be placed in the SEQ LT latches 100. If the VALID PAGE bit in the Event Stack Register is set at the conclusion of the next attempt, after the MEM DONE line from the memory 5 becomes active, then the channel 3 returns to the Channel Poll Sequence; otherwise, the channel 3 again stops with the ST9 line active and indicates an error to the CPU 1 by activating the SET EX BIT 9 line.

From the foregoing it is seen that the improved channel error logging apparatus of the present invention has means for recognizing the occurrence of a number of different types of errors and indicating their occurrence by storing a channel error code in a Channel Error Register 75. In response to the occurrence of an error, the apparatus forms a four-part channel error event, with one part in each byte of the four-byte CDRB Register 51. The channel error event includes one byte containing a channel function field and three bytes containing first, second and third identification fields. These first, second and third identification fields identify an I/O register, an I/O adapter and the type of error, respectively. Once the channel error event is formed, an attempt is made to store it on the top of the I/O Event Stack. If this succeeds, the channel notifies the CPU 1 of the stored error event and returns to a normal channel poll state. If the attempt to store the channel error event fails, the channel 3 is stopped until the CPU 1 signals the channel 3 to restart and to again attempt to log the channel error event on the I/O event stack.

While the preferred embodiment of the invention has been illustrated and described, it is to be understood that the invention is not limited to the precise construction herein disclosed, and the right is reserved to all changes and modifications coming within the scope of the invention as defined in the appended claims.

Having thus described the invention, what is claimed as new, and desired to be secured by Letters Patent is:

1. In channel error logging apparatus for a computer system having an addressable storage for storing an input/output (I/O) event stack with the capacity to store a plurality of I/O events, a central processing unit (CPU) for retrieving I/O events from the I/O event stack in storage and for processing said I/O events where the retrieving and processing of said I/O events from said I/O event stack is performed by said CPU asynchronously to the placement of said I/O events on the I/O event stack, a plurality of I/O adapters connected to control I/O devices, a channel connecting the plurality of I/O adapters to the CPU and the storage, said channel including polling means for polling said I/O adapters on a priority basis for service requirements, said polling means, upon finding an I/O adapter requiring service, halting polling of other I/O adapters until released by the channel upon completion of servicing of the I/O adapter requiring service, and a plurality of I/O registers accessible by the channel and the CPU, wherein each register is individually identifiable and where at least one I/O register contains an address for addressing said I/O event stack and where other I/O registers are used in association with an I/O adapter to maintain command and data addresses for performing an I/O operation, the improvement comprising:

means for selectively giving said CPU or said channel access to said at least one I/O register which contains an address usable by said CPU or said channel for addressing the I/O event stack to store or retrieve a channel error I/O event on said stack;

means in said channel for indicating the occurrence and type of channel errors occurring in the channel and in the plurality of I/O adapters in connection with an I/O operation;

means responsive to the means for indicating the occurrence and type of channel errors for forming a channel error I/O event, said event including, a channel function field for identifying the type of I/O operation being performed at the occurrence of the channel error, a first identification field for identifying the I/O register in use at the occurrence of the channel error, a second identification field for identifying the I/O adapter using the channel at the occurrence of the channel error, and a third identification field for identifying the type of channel error which occurred;

means for storing the formed channel error I/O event in the I/O event stack at a location in addressable storage designated by the contents of said at least one I/O register; and means responsive to the termination of a channel error I/O event storage operation for signalling said channel to release said polling means to resume normal polling and servicing of the I/O adapters, independently of the CPU retrieving the stored event from the I/O event stack, said CPU retrieving said stored I/O events asynchronously to the placement of said I/O events on said I/O event stack.

2. The apparatus recited in claim 1 wherein the means for forming a channel error I/O event comprises a register in which the channel function field and the first, second and third identification fields are placed upon the occurrence of a channel error.

3. The apparatus recited in claim 1 wherein the means for indicating the occurrence of channel errors comprises means for indicating the occurrence of parity errors.

4. The apparatus recited in claim 1 wherein the means for indicating the occurrence of channel errors comprises means for indicating the occurrence of sequence errors.

5. The apparatus recited in claim 1 wherein the means for indicating occurrence of channel errors comprises means for indicating the occurrence of command errors.

6. The apparatus recited in claim 1 wherein the means for storing a formed channel error I/O event in the I/O event stack comprises:

selection means communicating with said means for selectively giving for obtaining access by the channel to the at least one I/O register containing an address pointer to the top of the I/O event stack;

means for requesting that a formed channel error I/O event be stored at the address indicated by the address pointer; and means for updating the address pointer to reflect the addition of a formed channel error I/O event to the top of the I/O event stack.

7. The apparatus recited in claim 1 further comprising means responsive to the means for storing the formed channel error I/O event for sensing completion of a storage operation and thereupon indicating to the CPU that a formed channel error I/O event has been stored in the I/O event stack.

8. The apparatus recited in claim 1 further comprising means responsive to the means in said channel for indicating the occurrence and type of channel errors for halting the I/O adapter using the channel at the occurrence of a channel error by issuing a signal to the I/O adapter.

* * * * *